United States Patent
Bell et al.

[11] Patent Number: 6,069,581
[45] Date of Patent: May 30, 2000

[54] HIGH PERFORMANCE VEHICLE RADAR SYSTEM

[75] Inventors: David Allen Bell, Altadena; Jimmy Moon Kan Li, Monrovia; Kelvin Chi Lee, West Covina, all of Calif.; Roger Rong Taur, Honolulu, Hi.

[73] Assignee: Amerigon, Irwindale, Calif.

[21] Appl. No.: 09/027,996

[22] Filed: Feb. 23, 1998

Related U.S. Application Data

[60] Provisional application No. 60/075,402, Feb. 20, 1998.

[51] Int. Cl.$^7$ ....................................................... G01S 13/00
[52] U.S. Cl. ................................. 342/70; 342/92; 342/95
[58] Field of Search .................................. 342/70, 72, 92, 342/95, 134, 135, 136; 340/904, 435, 436

[56] References Cited

U.S. PATENT DOCUMENTS

| | | |
|---|---|---|
| 2,974,304 | 3/1961 | Nordlund . |
| 3,226,673 | 12/1965 | Cudworth . |
| 3,569,927 | 3/1971 | Guyton et al. . |
| 3,697,985 | 10/1972 | Faris et al. . |
| 3,732,555 | 5/1973 | Strenglein . |
| 3,760,415 | 9/1973 | Holmstrom et al. . |
| 3,781,879 | 12/1973 | Staras et al. . |
| 3,789,950 | 2/1974 | Strenglein . |
| 3,934,252 | 1/1976 | Ross et al. . |
| 4,001,823 | 1/1977 | Matsui et al. . |
| 4,015,232 | 3/1977 | Sindle . |
| 4,260,980 | 4/1981 | Bates . |
| 4,278,962 | 7/1981 | Lin . |
| 4,280,123 | 7/1981 | Right et al. . |
| 4,300,116 | 11/1981 | Stahovec . |
| 4,356,489 | 10/1982 | Hirota et al. . |
| 4,358,759 | 11/1982 | Stewart et al. . |
| 4,404,541 | 9/1983 | Kodera et al. . |
| 4,528,563 | 7/1985 | Takeuchi . |
| 4,543,577 | 9/1985 | Tachibana et al. . |
| 4,603,317 | 7/1986 | Gailbreath et al. . |
| 4,673,937 | 6/1987 | Davis . |
| 4,803,488 | 2/1989 | Dombrowski . |
| 4,815,106 | 3/1989 | Propp et al. . |
| 4,843,367 | 6/1989 | Saito . |
| 4,864,298 | 9/1989 | Dombrowski . |
| 4,881,058 | 11/1989 | Berry, III . |
| 4,908,600 | 3/1990 | Martinez . |
| 5,028,920 | 7/1991 | Dombrowski . |
| 5,047,747 | 9/1991 | Gottlieb . |
| 5,278,862 | 1/1994 | Vander Mey . |
| 5,289,476 | 2/1994 | Johnson et al. . |
| 5,293,152 | 3/1994 | Bussin et al. . |
| 5,446,470 | 8/1995 | Avignon et al. . |
| 5,510,763 | 4/1996 | Deckard et al. . |
| 5,574,426 | 11/1996 | Shisgal et al. . |
| 5,652,566 | 7/1997 | Lambert . |
| 5,666,103 | 9/1997 | Davis, Jr. . |
| 5,682,136 | 10/1997 | Del Signore . |
| 5,710,539 | 1/1998 | Iida . |

FOREIGN PATENT DOCUMENTS

| | | |
|---|---|---|
| 0 412 719 | 2/1991 | European Pat. Off. . |
| 0 657 857 | 6/1995 | European Pat. Off. . |
| 0 817 152 | 1/1998 | European Pat. Off. . |
| WO 98/00728 | 1/1998 | United Kingdom . |

*Primary Examiner*—Ian J. Lobo
*Attorney, Agent, or Firm*—Knobbe, Martens, Olson & Bear, LLP

[57] ABSTRACT

A radar system is described for use in vehicular applications. The radar system is particularly suited to backup warning systems and side-object warning systems. The radar minimies many of the problems found in the prior art by providing programmable delays and programmable gain. The radar uses a range search algorithm to detect and sort targets at various ranges within the field of view of the radar. Each target range corresponds to a particular delay and gain setting. The radar searches for targets at the various ranges by running a target search algorithm. For each target range, the search algorithm causes the proper time delay and gain setting. Targets within the selected range are detected and catalogued. A display is used to warn the driver of the vehicle of the presence of targets at the various ranges. The warning may be visual and/or audible.

28 Claims, 18 Drawing Sheets

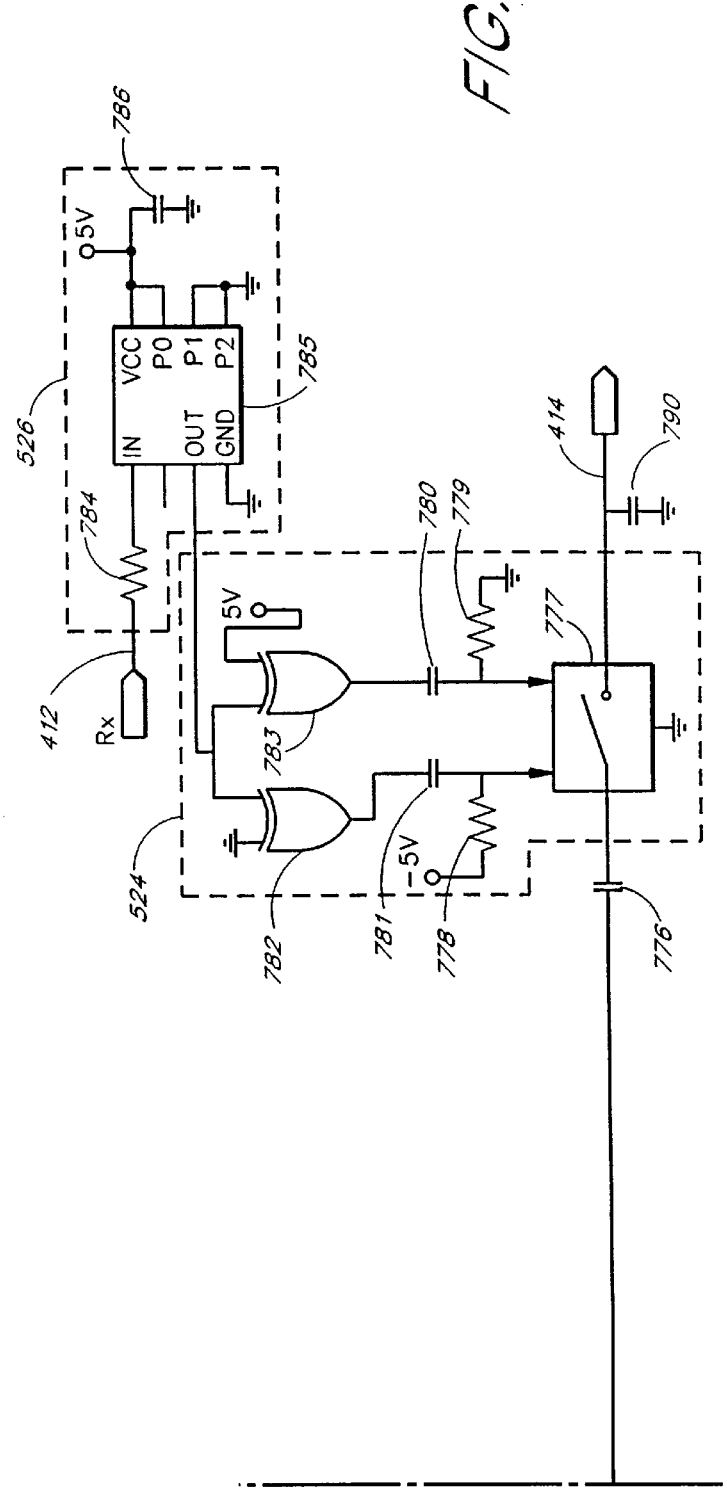

HIGH PERFORMANCE VEHICLE RADAR SYSTEM

RELATED APPLICATIONS

This application claims priority under 35 U.S.C. § 119(e) from U.S. Provisional Patent Application No. 60/075,402, filed Feb. 20, 1998, titled HIGH PERFORMANCE VEHICLE RADAR SYSTEM.

BACKGROUND OF THE INVENTION

1. Field of the Invention

The present application relates to the field of radar systems for motor vehicles.

2. Description of the Related Art

Vehicle safety systems can generally be categorized as either crash protection systems or accident avoidance systems. Crash protection safety systems can minimize the effects of an accident, but an effective accident avoidance system can allow a driver to avoid an accident altogether. This is the basic philosophy which makes automotive radar so attractive as a potential accident avoidance system. Radar systems are particularly suited to backup warning systems which warn the driver that the vehicle is about to back into an object such as a child or another vehicle. Radar systems are also particularly suited to side-object warning systems (also known as blind-spot warning systems) that warn the driver not to change lanes because another vehicle is in the region known as the driver's "blind-spot" or side-object region. The left side-object region is typically slightly behind and to the left of the driver's vehicle. The right side-object region is typically slightly behind and to the right of the driver's vehicle. Many lane-change collisions occur because a driver of a first vehicle desiring to change lanes does not see a second vehicle in an adjacent lane, especially when the front bumper of the second vehicle is beside the rear portion of the first vehicle.

Yet, in spite of the obvious desirability, and decades of research, automotive warning radars have not been widely used. To date, automotive radar warning systems have been either too primitive to provide useful information to the driver, or too expensive. Many vehicle radar warning systems in the prior art merely detect the presence of a target, any target, without providing the driver with any information as to the nature or location of the target. One target characteristic of great importance is the distance from the radar to the target (the downrange distance). Many of the simple, inexpensive, radars proposed for automotive use provided no downrange information. Those radars that do provide downrange information typically do not provide accurate downrange information for multiple targets because the radars cannot discriminate between multiple targets. Radars that do attempt to discriminate between multiple targets are generally too costly for most drivers to afford.

The simplest automotive radar systems use a Continuous Wave (CW) radar in which a transmitter continuously transmits energy at a single frequency. The transmitted energy is reflected by a target object and received by the radar receiver. The received signal is Doppler shifted by movement of the target object relative to the radar. The CW receiver filters out any returns without a Doppler shift (i.e., targets which are not moving with respect to the radar). When the receiver detects the presence of a Doppler shifted signal, the receiver sends a signal to a warning device that warns the driver. Unfortunately, this type of radar provides no downrange information, and so the driver does not know how close the object is to the vehicle.

Another type of radar found in prior art radar warning systems is a two-frequency CW radar. The two-frequency CW radar transmits energy at a first frequency and a second frequency. The transmitted energy is reflected by a target object and received by a two-frequency CW receiver. The receiver measures the difference between the phase of the signal received at the first frequency and the phase of the signal received at the second frequency. The distance to the target object can be calculated from the measured phase difference. Unfortunately, the two-frequency CW radar performs poorly when there are multiple targets within the field of view of the radar. The simple two frequency system cannot discriminate between two targets at different ranges and thus, the range measurements obtained from a two frequency CW system in the presence of multiple targets is unreliable.

Frequency Modulated Continuous Wave (FMCW) radars have also been used in automotive applications, especially for forward looking systems such as automatic braking and automated cruise control. In an FMCW radar, the frequency of the transmitted signal is swept over time from a starting frequency to an ending frequency. The transmitted signal is reflected by a target and received by the FMCW receiver. The signal received by the receiver is delayed in time according to the travel time of an electromagnetic wave from the transmitter, to the target, and back to the receiver. Since the frequency of the transmitted signal is being varied over time, at any instant in time the frequency of the received signal will be slightly different than the frequency of the transmitted signal. In the absence of Doppler shifting, the distance to the target can be calculated by comparing the frequency of the received signal to the frequency of the transmitted signal. The presence of Doppler shifting will shift the frequency of the received signal and make the target appear to be closer or further away than it actually is.

UltraWideband (UWB) impulse radars have also been proposed for use in vehicle warning systems. However, UWB radars are undesirable because these radars transmit energy over very wide bandwidths and create electromagnetic interference which can interfere with other radio frequency systems such as broadcast radio, television, cellular phones, etc. UWB radars must operate at very low power in order to avoid violating rules promulgated by the Federal Communications Commission (FCC). In addition, UWB radars require antennas which can be used with the very broadband signals transmitted and received by the radar. These very broad band antennas can be difficult to design and build.

SUMMARY OF THE INVENTION

The present invention solves these and other problems by providing a radar system that can track and discriminate multiple Doppler shifted targets while using a transmitted signal which can be adapted to fit within the radar bands allocated by the FCC. The radar can provide crossrange and downrange information on multiple targets and is not confused by the presence of Doppler shifting. The radar is simple to build, low in cost, and is well suited to vehicular applications. The radar system is particularly suited to backup warning systems and side-object warning systems in which the driver of a vehicle needs to be warned of an impending collision with an object which is out of the driver's immediate field of view. The present radar minimizes many of the problems found in the prior art by transmitting a pulsed carrier frequency and using a receiver with programmable delays and programmable gain. The receiver uses a range search algorithm to detect and sort targets at various ranges within the field of view of the radar. Each target range corresponds to a particular delay and gain setting. For each target range, the search algorithm sets the proper time delay and gain setting. Targets within the selected range are detected and catalogued. A display is used to warn the operator of the vehicle of the presence of targets at the various ranges. The warning may be visual and/or audible. Crossrange information is obtained by using multiple radar sensors. Each radar sensor detects targets in a different region around the vehicle. In some embodiments, these regions overlap such that a target may be detected by more than one radar sensor. In one embodiment, the radar is designed to ignore objects which are stationary with respect to the radar (i.e., targets without Doppler shift). Stationary targets, such as reflections from other parts of the vehicle on which the radar is mounted, usually represent little risk of collision and thus are desirably ignored.

The present radar system may be used inside the passenger compartment of a vehicle to detect the presence, size, position, velocity, and/or acceleration of passengers or other objects within the vehicle. Such information can be used, for example, in an intelligent airbag deployment system. The radar may also be used inside the passenger compartment to as part of a throttle position sensing system which detects the throttle position by detecting the location of a portion of the mechanical throttle linkage, such as, for example, the location of the "gas pedal." In a similar fashion, the radar may also be used to detect the position of the brake pedal, seats, etc.

The radar may be used outside the passenger compartment to detect objects behind the vehicle, beside the vehicle, in front of the vehicle, etc. The radar may be used as part of an active suspension system. In one embodiment, the radar may be used to measure the height of the vehicle above the road surface. The radar may also be used to detect the position, velocity, and acceleration of portions of the vehicle suspension system. The radar may also be used to detect anomalies or changes in the road surface. Such anomalies include changes in surface texture, holes (e.g., "pot-holes"), etc. Information on road surface anomalies may be supplied to the driver, to an active suspension system, etc.

In one embodiment, several intelligent radar sensors are placed in and around the vehicle and each radar sensor is connected to a vehicle information bus. Each radar sensor measures targets within its field of view and broadcasts the radar target information to the vehicle information bus. Other vehicle systems, such as, for example, display units, suspension units, airbag units, etc. are also connected to the information bus. These other vehicle systems receive the radar target information and use the information to improve the operation, safety, and/or convenience of the vehicle.

The radar sensor may furher compute a time to impact based on a downrange distance to a target and a relative velocity between the target and the radar sensor. The radar may provide a field of view that corresponds approximately to the side-object region can be used as both a collision avoidance system and a lane change aid.

In yet another embodiment, the radar may include an audible warning device configured to project an audible warning signal which varies according to the downrange distance of the closest target, or the relative velocity between the radar and a target, or the time to impact between the radar and a target.

Yet another embodiment of the present invention is an intelligent display for providing information to a driver of a vehicle. The intelligent display includes a sensory display, such as an audible or visual display, and a control processor. The control processor is configured to receive sensor information from a vehicle information bus. The sensor information includes data measured by one or more sensors, such as radar sensors, connected to the information bus. The control processor prioritize the sensor information and formats the sensory display based on the sensor information.

BRIEF DESCRIPTION OF THE FIGURES

The various novel features of the invention are illustrated in the figures listed below and described in the detailed description which follows.

FIG. 7, comprising FIGS. 7A and 7B, is a circuit schematic of the RF section corresponding to the block diagram shown in FIG. 5.

Figure 1A:
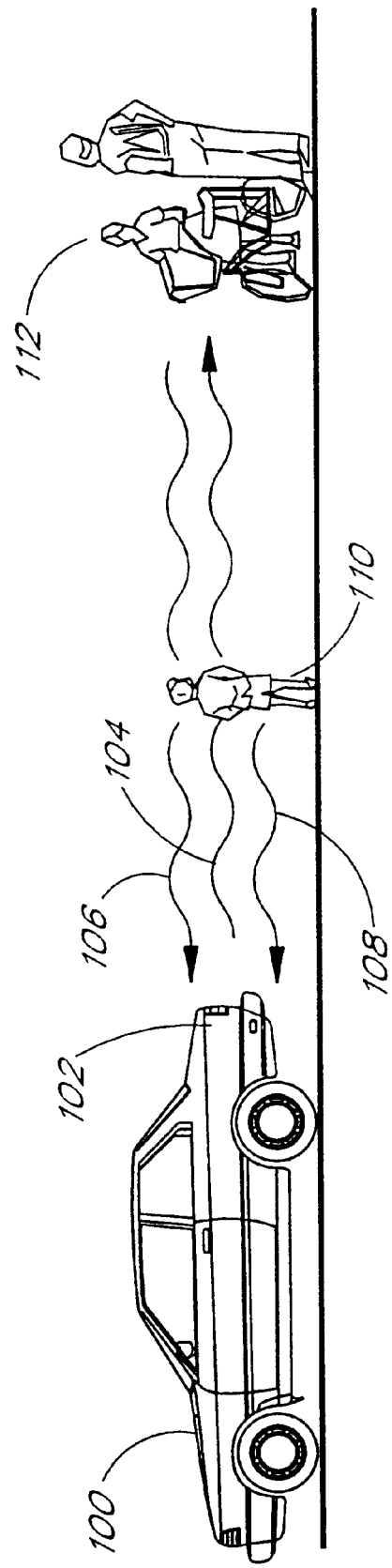
FIG. 1A illustrates the operation of a backup warning radar system attached to an automobile.

In the drawings, the first digit of any three-digit number indicates the number of the figure in which the element first appears. For example, an element with the reference number 404 first appears in FIG. 4. Where four-digit reference numbers are used, the first two digits indicate the figure number.

DETAILED DESCRIPTION OF THE PREFERRED EMBODIMENT

FIG. 1A illustrates an automobile 100 operating with a backup warning radar system 102. The radar system 102 may be a single radar unit comprising a radar sensor and a control unit. Alternatively, the radar system 102 may be a plurality of radar sensors connected to a common control unit. The radar system 102 may include sensing capabilities for a backup warning system and may also include sensing capabilities for a side-object warning system. The radar system 102 transmits electromagnetic energy (waves) 104 which illuminate targets such as a child 110 and a group 112.

The child 110 reflects a wave 108 back to the radar and the group 112 reflects a wave 106 back to the radar. Since the child 110 is closer to the radar 102 than the group 112, the waves 108 reflected from the child 110 will reach the radar 102 before the wave 106 from the group 112 reaches the radar 102. The radar 102 receives the waves 106 and 108 and warns the driver of the automobile 100 that an object is behind the automobile 100. The radar 102 has a field of view which extends generally behind the vehicle 100. Although the field of view is three dimensional, having a depth, width, and height, since the vehicle moves in two dimensions, it is convenient to talk in terms of a two dimensional field of view. The two dimensional field of view extends some distance behind the vehicle in a downrange direction, and the field of view extends some width behind the vehicle in a crossrange direction. The radar can "see" targets within the field of view defined by the crossrange and downrange limits.

In addition to the field of view, the ability of the radar to see targets is affected by the apparent size of the target. The apparent size of the target is not the actual size, but rather, the size as seen by the radar, measured as a radar cross-section in Decibels per Square Meter (dbsm). The apparent size of an object is often unrelated to the actual size of the object. For example, to the radar 102, the child 110 may appear to be smaller than the group 112. Conversely, the group 112 may appear to be smaller than the child 110. The driver of the automobile 100 should be warned about the child 110 first because the child is closer to the automobile 100 than the group 112. If the driver stops in time to avoid hitting the child 110, then the driver will avoid hitting the group 112 as well. Thus, the radar 102 advantageously warns the driver more strongly about targets that are closer to the radar 102. Targets that are farther from the radar 102 are, at least temporarily, less important and require less of a warning.

Figure 1B:
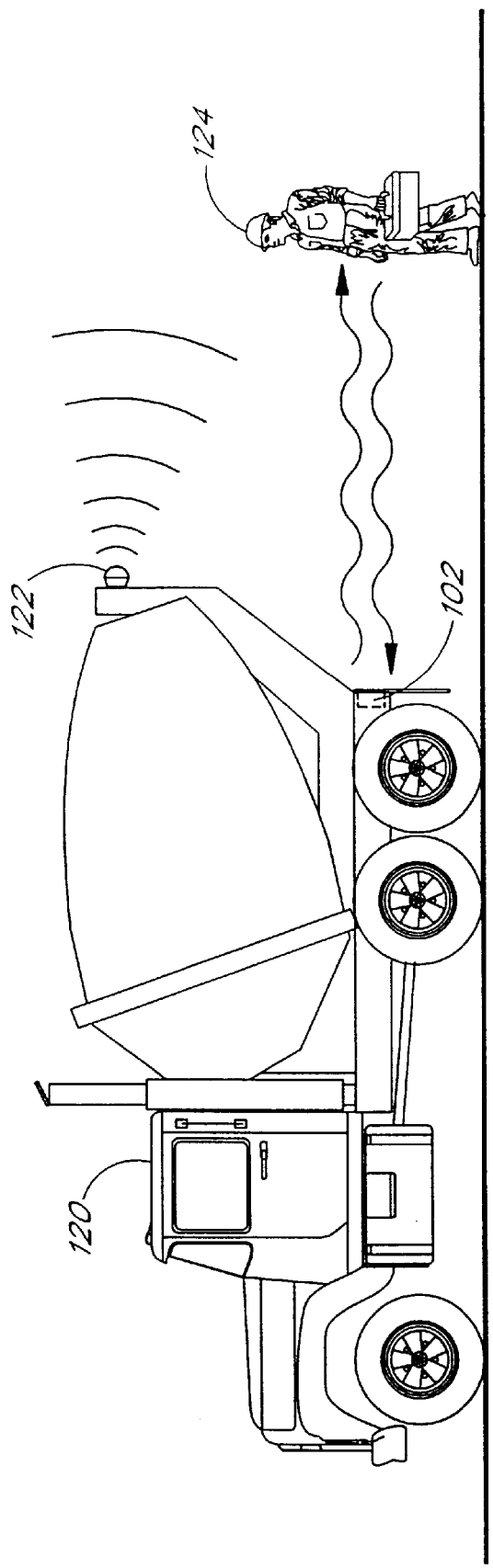
FIG. 1B illustrates a backup warning system attached to a heavy construction vehicle.

FIG. 1B is similar to FIG. 1A but further illustrates the use of a backup warning radar in a construction or heavy equipment environment. In FIG. 1B, the radar 102 is attached to heavy construction vehicle 120. The construction vehicle 120 includes a backup warning device 122 which emits an audible beeping signal whenever the vehicle 120 is backing up. Required warning devices such as the warning device 122 are intended to warn people, such as a worker 124 standing behind the vehicle 120, that the vehicle is backing up. However, experience has shown that in a noisy construction site with many warning devices 122, workers begin to ignore the warning sound and thus accidents involving vehicles backing over workers still occur. Furthermore, the warning device 122 is only effective against people since the driver of the vehicle 120 may still back into an inanimate object. Thus, there is a need for radar warning devices in the construction or heavy equipment environment as well. Such warning devices may provide a different warning external to the vehicle than to the driver.

In either of the situations shown in FIGS. 1A and 1B, the usefulness of the radar system 102 lies, in part, in the accuracy of the warnings provided. For example, if the radar 102 is so sensitive that it sounds a false alarm every time the vehicle 100 or 120 moves backwards, then the driver of the vehicle will quickly learn to ignore the warning and the effectiveness of the warning is lost. Conversely, if the radar 102 is made so insensitive that it does not sound an alarm in time, then again, the effectiveness of the warning is lost. Many prior art radar systems attempt to control the number of false alarms by limiting the downrange field of view of the radar. Limiting the downrange field of view is a rather crude solution which denies the driver much of the information needed to avoid a collision in a real-world environment. The present radar system 102 reduces false alarms by providing the driver with additional information, such as downrange and crossrange information, regarding the targets within the field of view of the radar.

Figure 2:
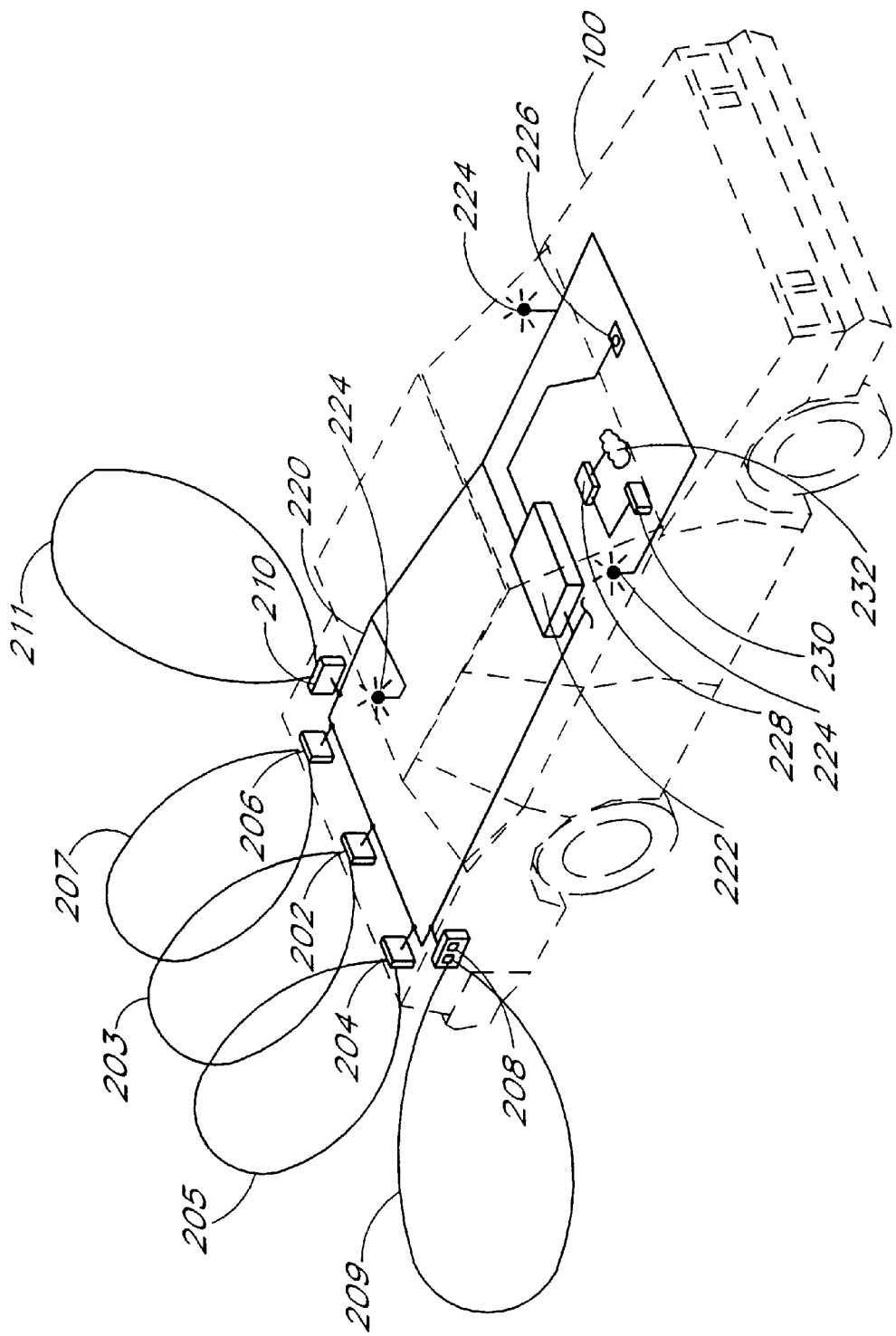
FIG. 2 illustrates the integration of several radar sensors into an automobile.

FIG. 2 illustrates the integration of several radar sensors into the automobile 100. The automobile 100 is used in FIG. 2 for illustrative purposes only, any vehicle, craft, or structure which could benefit from such radar sensors can be used in place of the automobile 100. Radar sensors 202, 204, and 206 are placed on the rear of the vehicle facing backwards. The sensors 202, 204, and 206 each comprise a radar transmitter and receiver circuit, a transmit antenna, and a receive antenna. The sensor 202 is mounted on the rear center portion of the vehicle and senses targets in a Field of View (FOV) 203 that extends generally directly behind the vehicle. The sensor 204 is placed on the right rear portion of the vehicle and senses targets which are in a FOV 205 that is generally behind the vehicle but to the right of targets sensed by the sensor 202. The sensor 206 is placed on the left rear portion of the vehicle and senses targets which are in a FOV 207 that is generally behind the vehicle but to the left of targets sensed by the sensor 202. The sensor 208 is placed on the right rear of the vehicle and senses targets in a FOV 209 that generally covers the driver's right side-object region. The sensor 210 is placed on the left of the vehicle and senses targets in a FOV 211 that generally covers the driver's left side-object region. The use of five sensors 202, 204, 206, 208, and 210 is preferred, but the use of more or fewer sensors is within the scope of the present invention.

Each of the sensors 202, 204, 206, 208, and 210 is connected to a data bus 220. The data bus 220 is connected to a central control unit 222. The data bus 220 may be dedicated to radar functions. Alternatively, the bus may be a general data bus used by many systems in the vehicle 100. The bus 220 may be a custom bus using non-standard protocols or the bus 220 may use standard protocols, such as, for example, Universal Serial Bus (USB), IEEE-1394 fire wire, ISB, etc. The central control unit 222 monitors, controls the operation of, and gathers data from each of the sensors 202, 204, 206, 208, and 210. The control unit 222 uses data gathered from the sensor to identify targets. A backup switch 226 is connected to the control unit 222 to indicate that the automobile 100 is in reverse. When the automobile 100 is in reverse and a target is identified, then the control unit 222 warns the driver using one or more displays 224.

The control unit 222 may be a control unit dedicated to radar functions or a vehicle control unit which provides general command and control functions for the vehicle 100. In an alternative embodiment, the radar control functions represented by the central control unit 222 are built into each of the sensors 202, 204, 206, 208, and 210 such that each sensor may function as a relatively autonomous sensor that detects targets within its field of view and provides target information to the bus 220 for use by other systems in the vehicle 100.

In one embodiment the displays 224 are provided in areas of the vehicle where a driver will naturally be looking while the vehicle is in reverse. Such areas include areas near rear view mirrors, and near the back of the passenger compartment. Most vehicles are equipped with left and right outside rear-view mirrors, and an inside rear view mirror which is usually mounted near the top and center of the front windshield. Thus, in a preferred embodiment, a first display 224 is provided near the left outside rear-view mirror, a second display 224 is provided near the right outside rear-view mirror, and a third display 224 is provided near the inside rear view mirror. A display 224 may also be provided near the center of the rear window of the vehicle, either at the top of the window, at the bottom of the window, or both.

The displays 224 may be connected to the bus 220 as shown in FIG. 2. In one embodiment, the control unit 222 sends commands directly to each display unit 224 that control the operation of the control unit.

In an alternative embodiment, the display units 224 are not controlled by direct commands from the control unit 222, but rather, act as intelligent, relatively autonomous, display devices that monitor the information on the bus 220 and display information based on decisions made within the control 224. For example, the control unit 222 may broadcast general target information not directed to any particular control unit (e.g., "target at 3 meters") and a control unit 224 connected to the bus 220 may receive the target information and produce a warning display for the driver. Using this embodiment, the number of displays 224, as well as the type of display (e.g., audio, visual, etc.) and the manner in which the information is displayed can be changed without changing the control unit 222.

In a particularly modular embodiment: the radar sensors 202, 204, 206, 208, and 210 are intelligent sensors, each comprising an internal control unit and each broadcasting target information on the bus 220; and the sensors 224 are intelligent display devices that monitor the information on the bus 220 and display information based on decisions made within the display unit 224. The intelligent sensors may operate in a relatively autonomous mode, or the intelligent sensors may operate in a cooperative mode where one or more of the intelligent sensors communicate with each other. In one cooperative mode, the intelligent sensors operate in a master-slave configuration where one intelligent sensor operates as the master and the other intelligent sensors operate as the slaves.

Alternatively, the displays 224 may be connected directly to the control unit 222, rather than the bus 220, and are controlled by the control unit 222.

The display 224 may also be provided outside of the vehicle to warn people behind the vehicle. The outside display 224 may be audio, visual, or both and may be provided in combination with the warning device 122 or in lieu of the device 122. The outside display preferably provides a distinct sound which changes as the vehicle approaches the person 124. Thus, a person 124 standing behind a vehicle 120 hears one sound when the vehicle 120 is far away, or moving slowly, and thus posing little risk to the person 124. The person 124 hears a different sound when the vehicle 120 is close, or moving rapidly towards the person 124 and thus posing a significant risk to the person 124.

FIG. 2 illustrates one embodiment of a system for connecting multiple sensors to a control unit 222 wherein the sensors and the control unit 222 are connected to a common bus 220. The bus 220 may comprise wires, optical fibers, or both. The bus 220 may carry only data for the radar sensors or the bus 220 may be a more general purpose vehicle bus which carries data to and from other vehicle systems. Connecting the radar sensors and/or the controller 222 to a general purpose vehicle bus allows greater interaction between the radar system and other systems in the vehicle, such as, for example, an automatic braking system, an airbag system, a display system, etc. In another embodiment, each sensor (such as the sensor 202, 204, 206, 208, or 210) is connected to the control unit 222 by a separate cable.

FIG. 2 also shows a radar sensor 230 inside the passenger compartment. The radar sensor 230 is connected to a control unit 228 that controls an airbag 232. The radar sensor 230 provides data about a passenger, such as size and location of the passenger, to the control unit 228 and thus improves the ability of the control unit 228 to deploy the airbag 232 effectively.

Figure 3A:
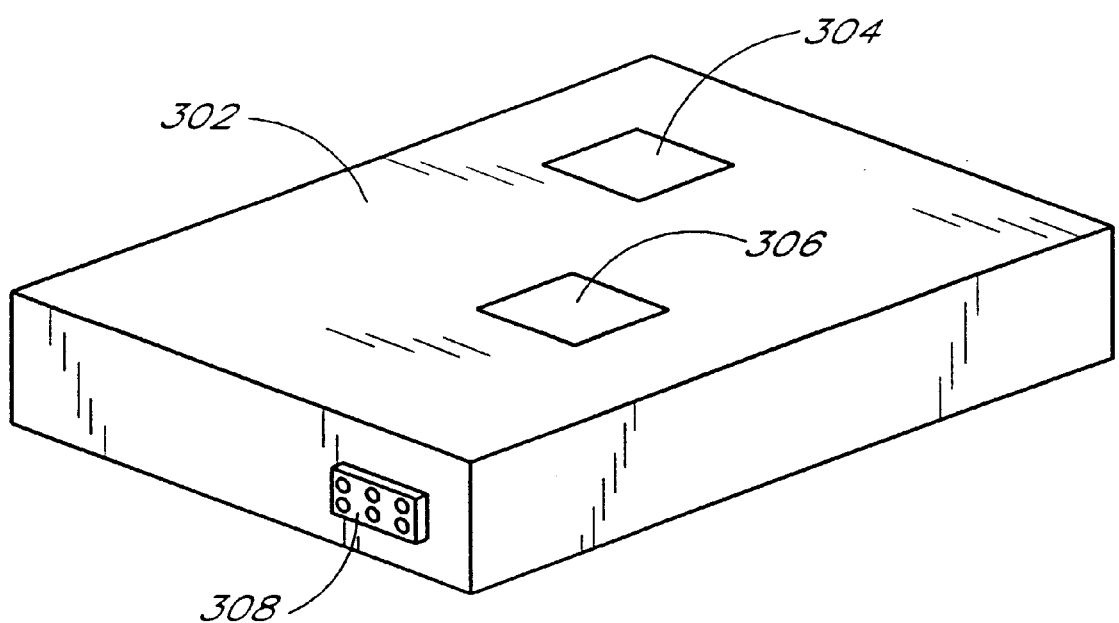
FIG. 3A illustrates a self contained radar system with integral patch antennas.

FIG. 3A illustrates a self contained radar unit 302 with integral patch antennas, including a transmit antenna 304 and a receive antenna 306. The antennas may include multiple patches configured to desirably shape the antenna radiation pattern. A connector 308 provides power, input signals, and output signals from the unit 302. The radar unit 302 may be a sensor, such as the sensor 202, comprising a transmitter and receiver but no central control system. Alternatively, the radar unit 302 may be a complete radar system, comprising a radar sensor (such as the sensor 202) and a control unit such as the control unit 222. In a preferred embodiment, the antennas 304 and 306 are printed circuit patch antennas, but other antennas may be used.

Figure 3B:
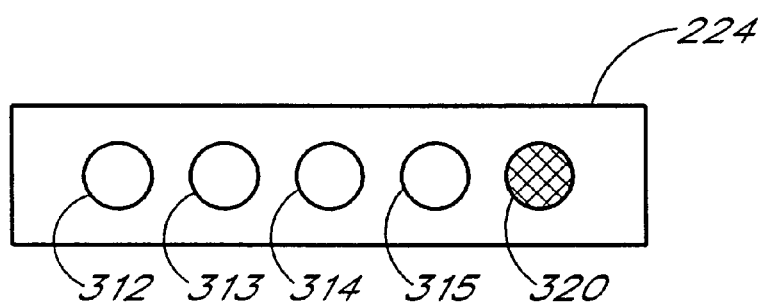
FIG. 3B illustrates a display panel for use with a radar warning system.

FIG. 3B illustrates a display panel 224 for use with the present radar warning system and includes light emitting diodes 312–315 and an audible warning device 320. The diodes 312–315 are used to indicate how close a target is to the automobile 100. In one embodiment, the diode 312 corresponds to the closest targets and the diode 315 corresponds to the most distant targets. In a preferred embodiment, all of the diodes 312–315 are illuminated when a close target is detected and only one of the diodes is illuminated when the only target detected is a distant target. In an alternative embodiment, the number of diodes illuminated is determined by the relative velocity of the target to the radar. In yet another embodiment, the number of diodes illuminated is determined by the time to impact between the target and the radar, a shorter time to impact causing more diodes to be illuminated. In one embodiment, the audible warning device 320 sounds a loud warning when a target is detected at a close range, a quiet warning when a target is detected at a medium range, and no warning when a target is detected at a distant range. The audible warning may comprise a spoken warning message according to the detected target size or range.

Figure 4:
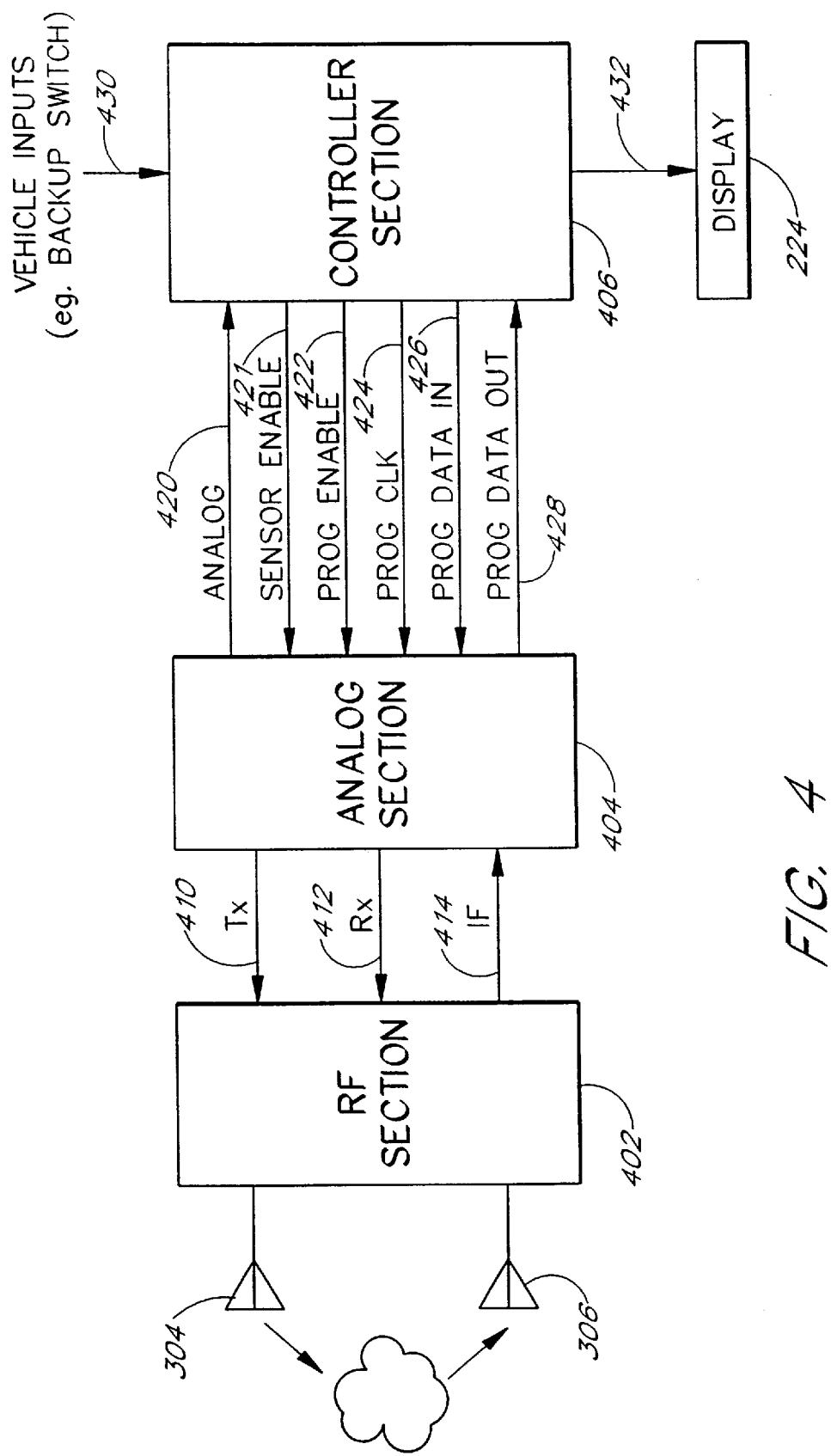
FIG. 4 is a block diagram showing the interaction between the RF, analog, and controller sections of the radar system.

FIG. 4 is a block diagram of the radar system 102 showing the interaction between a Radio Frequency (RF) section 402, an analog section 404, and a controller section 406. In a preferred embodiment, the RF section 402 and the analog section 404 together comprise a radar sensor, such as the radar sensors 202, 204, 206, 208, 210, and 230 shown in FIG. 2. For convenience, only one RF section 402 and analog section 404 are shown in FIG. 4, with the understanding that multiple RF sections 402 and multiple analog sections 404 may be connected to a control section 406. The control section (controller) 406 preferably provides the control functions indicated by the controllers 222 and 228 in FIG. 2. In a preferred embodiment, the control section 406 comprises a microprocessor-based controller with an Analog to Digital Converter (ADC) for converting the analog signal 420 into a digital format. In an alternative embodiment, the ADC may be moved to the analog section 404 so that radar target data is passed from the analog section 404 to the controller section 406 in digital form. The ADC is preferably a 12-bit converter.

The RF section 402 provides a transmitter output signal to the transmit antenna 304. The receive antenna 306 provides received signals to the RF section 402. The analog section 404 provides a transmit timing signal 410 and a receive timing signal 412 is to the RF section 402. The RF section 402 provides an Intermediate Frequency (IF) signal 414 to the analog section 404. The IF signal 414 comprises signals which have been received by the RF section 402 and downconverted to baseband as explained in more detail below.

As explained in more detail below in the text accompanying FIGS. 5 and 6, a pulse on the transmit timing signal 410 causes the RF section to send an RF transmit pulse to the transmit antenna 304. Some time after each transmit pulse, the analog section 404 sends a pulse on the receive timing signal 412 to open a receive window. Since the receive window is only open for a specified period of time, only targets within that time period are seen by the radar. The target time can easily be converted to distance because the timing of a received wave from a particular target is a function of the travel time for the electromagnetic wave from the transmit antenna to the target and back to the receive antenna. The travel time for an electromagnetic wave in air is approximately 1 nanosecond (ns) per foot. Thus, the receiver time window for a target 1 foot away from the transmit and receive antennas is approximately 2 ns after the transmit pulse. When the receive window opens, the RF section 402 sends IF data on the IF signal 414 to the analog section 404.

The analog section 404 provides further signal processing on the IF signal 414 to produce an analog radar signal 420. The analog section 404 provides the analog radar signal 420 to the controller section 406. The analog radar signal 420 is the analog output from the radar and includes all target information. The controller 406 uses an analog to digital converter to convert the analog radar signal 420 into the digital domain for further target processing.

The controller 406 provides a sensor enable signal 421, a program enable signal 422, a program clock 424, and a program data in signal 426 to the analog section 404. When asserted, the sensor enable signal 421 causes the radar analog section 404 to start sending the transmit timing signal 410 to the RF section 402. The program enable signal 422, the program clock 424, and the program data in signal 426 are used by the controller to program and configure portions of the analog section 404, including a programmable delay line and a two stage programmable gain amplifier described in connection with FIG. 6.

Figure 5:
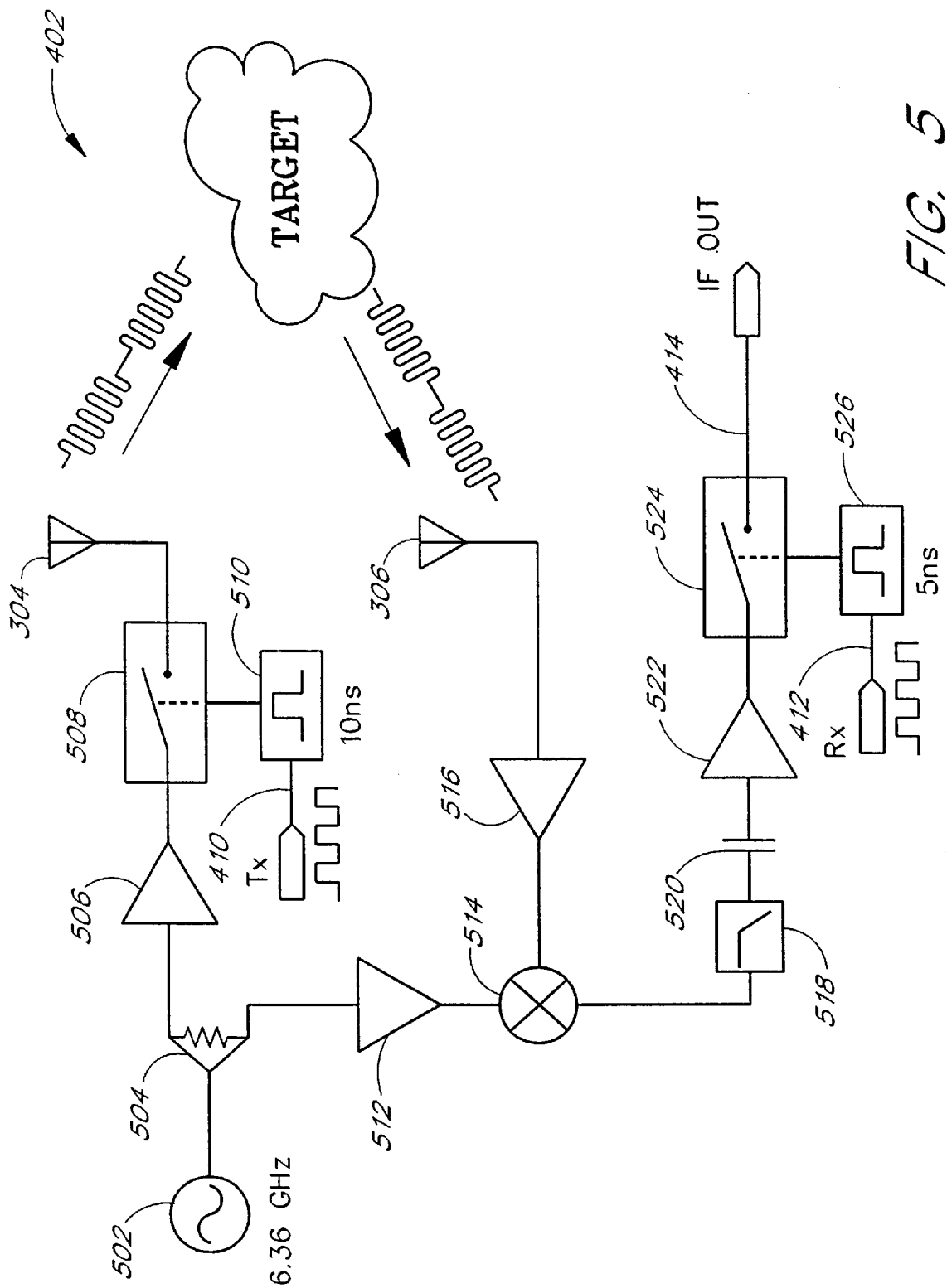
FIG. 5 is a block diagram which illustrates the RF section shown in FIG. 4.

FIG. 5 is a block diagram of the RF section 402. A carrier frequency oscillator 502 in the RF section 402 provides an RF signal to an input of a power divider 504. In a preferred embodiment, the oscillator 502 provides a 5.8 GHz signal. A first output of the power divider 504 is provided to an input of an RF amplifier 506. An output of the RF amplifier 506 is provided to one terminal of a Single Pole Single Throw (SPST) switch 508. A second terminal of the SPST switch 508 is provided to the transmit antenna 304. The SPST switch 508 is a high frequency switch which can be switched on and off in nanosecond timeframes. The SPST switch 508 is also configured to pass the RF signal at 5.8 GHz without significant attenuation.

The transmit signal 410 is provided to a pulse generator 510 which provides a fixed width pulse to a control input of the SPST switch 508. The SPST switch 508 is normally in an open position. The pulse provided by the pulse generator 510 closes the SPST switch 508 for a fixed time interval and then re-opens the SPST switch 508 until the next transmit pulse. During the time interval when the SPST switch 508 is closed, the unmodulated 5.8 GHz carrier at the output of the RF amplifier 506 is provided to the transmit antenna 304 and a short burst of RF energy is transmitted by the antenna. In a preferred embodiment, the SPST switch 508 is closed for 10 nanoseconds. Thus, in the preferred embodiment, the bandwidth of the transmitted pulse is approximately 200 MHz or approximately 3% of the carrier 5.8 GHz frequency.

A second output of the power divider 512 is provided to an input of an RF amplifier 512. An output of the RF amplifier 512 is provided to a Local Oscillator (LO) input of a mixer 514. An output of the receive antenna 306 is provided to an input of an RF Low Noise Amplifier (LNA) 516 and an output of the amplifier 516 is provided to an RF input of the mixer 514. An output of the mixer 514 is provided to an input of a lowpass filter 518. An output of the lowpass filter 518 is fed through a Direct Current (DC) block 520 to an input of an IF amplifier 522.

Energy transmitted by the transmit antenna 304 is reflected by targets within the FOV and is received by the receiving antenna 306. If the target is stationary with respect to the antennas 304, 306, then the received energy will have the same frequency as the transmitted energy (5.8 GHz). If the target is not stationary with respect to the antennas 304, 306, then the received energy will, due to the Doppler effect, be shifted in frequency. The frequency shift is approximately 25 Hz/mile/hour. The mixer 514, lowpass filter 518, and DC-block 520 downconvert and filter the received signal from RF frequencies to IF (audio) frequencies. Received energy which is not Doppler shifted will appear at the output of the mixer 514 as DC and will be blocked by the DC-block 520. Received energy which is Doppler shifted will appear at the output of the mixer 514 at the baseband Doppler shift frequency. Thus, a target moving at 2 miles/hour with respect to the antennas will produce a signal of approximately 50 Hz at the output of the IF amplifier 522.

An output of the IF amplifier 522 is provided to a first terminal of a SPST switch 524. A second terminal of the SPST switch 524 is the IF signal 414. The receive timing signal is provided to an input of a pulse generator 526 and an output of the pulse generator 526 is provided to a control input of the SPST switch 524.

Like the SPST switch 508, the SPST switch 524 is normally in an open position. The pulse provided by the pulse generator 526 closes the SPST switch 524 for a fixed time interval and then re-opens the SPST switch 524 until the next receive timing pulse occurs on the receive timing pulse signal 412. During the time interval when the SPST switch 524 is closed, the IF signal at the output of the IF amplifier 522 is provided to the IF signal path 414. In a preferred embodiment, the SPST switch 524 is closed for 5 nanoseconds.

Figure 6A:
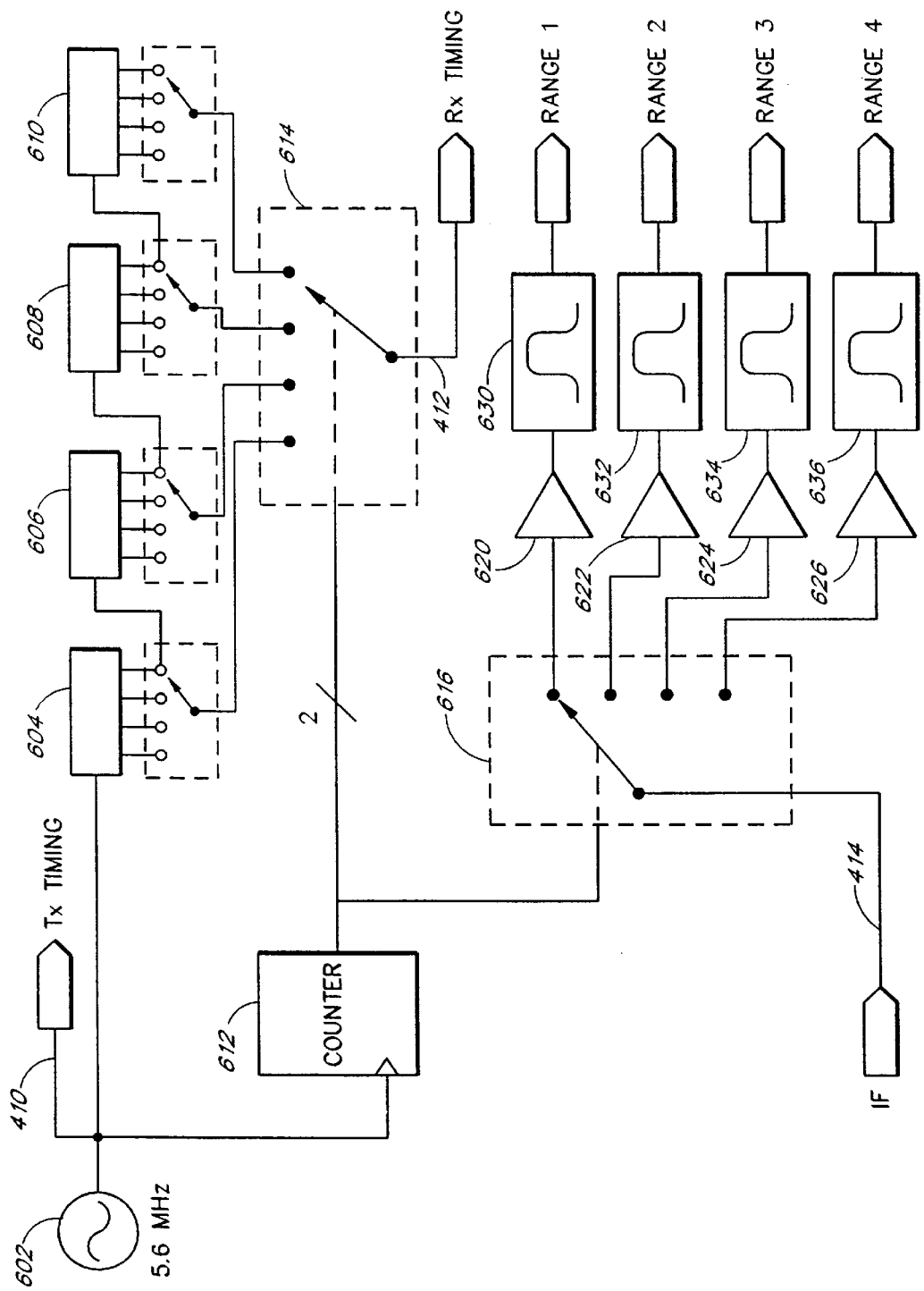
FIG. 6A is a block diagram of one embodiment of the analog section shown in FIG. 4.

FIG. 6A is a block diagram of one embodiment of the analog section 404. The embodiment shown in FIG. 6A advantageously operates without the use of a separate controller section 406, but it is limited to a preset number of range outputs. In FIG. 6A, an output of a pulse repetition frequency (PRF) generator 602 is provided to the transmit timing signal 410, to an input of a selectable time delay 604, and to a clock input of a programmed counter 612. In a preferred embodiment, the PRF generator operates at a frequency of 5.7 MHz.

Each of four time delay outputs of the time delay 604 are provided to a separate throw of a Single Pole Four Throw (SP4T) switch 605. The fourth (longest) time delay output of the time delay 604 is also provided to an input of a time delay 606. Each of four time delay outputs of the time delay 606 are provided to a separate throw of a SP4T switch 607. The fourth (longest) time delay output of the time delay 606 is also provided to an input of a time delay 608. Each of four time delay outputs of the time delay 608 are provided to a separate throw of a SP4T switch 609. The fourth (longest) time delay output of the time delay 608 is also provided to an input of a time delay 610. Each of four time delay outputs of the time delay 601 are provided to a separate throw of a SP4T switch 611. The poles of each of the SP4T switches 605, 607, 609, and 611 are each provided to a separate throw of a SP4T switch 614. The pole of the switch 614 is the receive timing signal 412.

Two of the output bits of the counter 612 are provided to a control input of the SP4T switch 614 and to a control input of a SP4T switch 616. The IF signal 414 is provided to the pole of the SP4T switch 616. Each throw of the SP4T switch 616 is connected to an input of separate IF amplifier (amplifiers 620, 622, 624 and 626). An output of the IF amplifier 620 is connected to an input of a bandpass filter 630. An output of the IF amplifier 622 is connected to an input of a bandpass filter 632. An output of the IF amplifier 624 is connected to an input of a bandpass filter 634. An output of the IF amplifier 626 is connected to an input of a bandpass filter 636. The outputs of the bandpass filters 630, 632, 634, and 636 are analog target outputs, each output corresponding to a different downrange distance.

The counter 612 operates the SP4T switches 614 and 616 in unison such that each time delay selected by the SP4T switch 614 corresponds to a range output of the bandpass filters 630, 632, 634, and 636. In a preferred embodiment, the counter 612 moves the switches 614 and 616 to a new pole every 128th transmit pulse on the transmit timing signal 410. In other words, the switches 614 and 616 dwell on each range gate for 128 transmit pulses. The bandpass filters 630, 632, 634, and 636 operate like integrators to average the signal received from the 128 transmit pulses and thus smooth the output signals. The switches 604, 606, 608 and 610 are preset to provide a desired set of four delay times corresponding to four downrange distances. In a preferred embodiment, the four delay times are 1 nanosecond (ns), 8 ns, 13 ns, and 20 ns, corresponding to downrange distances of 0.5 ft, 4 ft, 6.5 ft, and 10 ft.

Figure 6B:
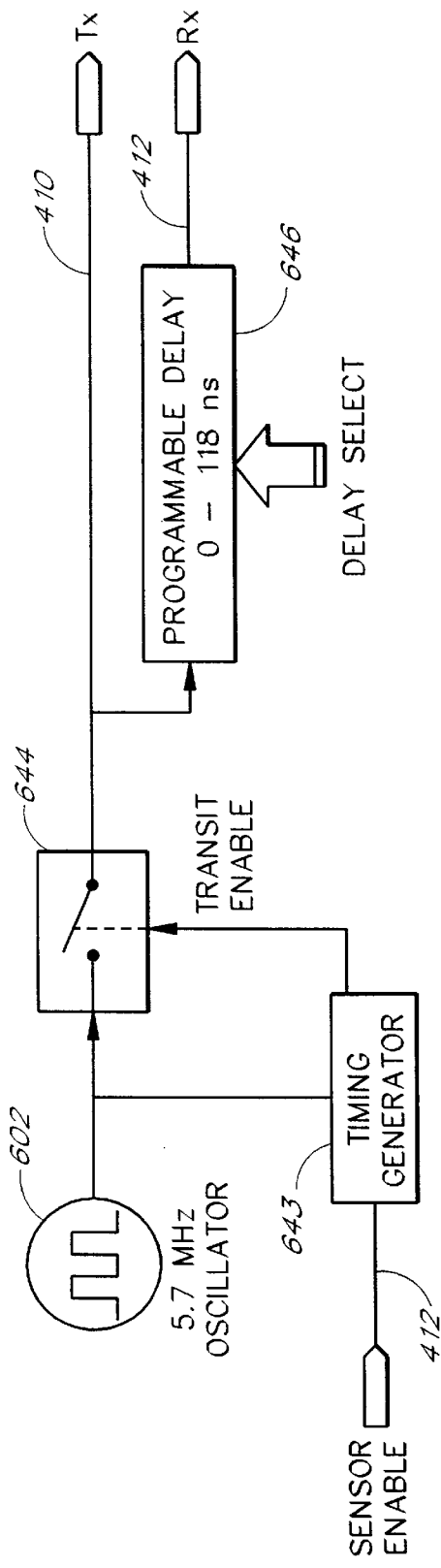
FIG. 6B is a block diagram of a preferred embodiment of the analog section shown in FIG. 4.
Figure 6B:
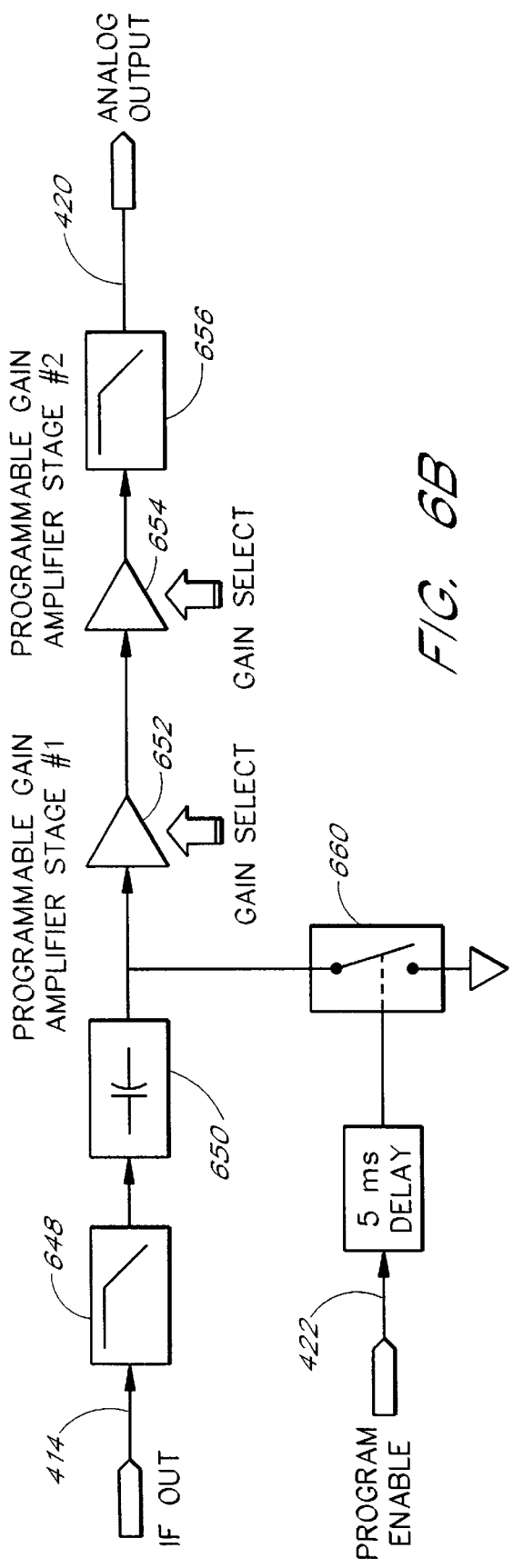

FIG. 6B is a block diagram of a preferred embodiment of the analog section 404 which provides programmable delays (range gates) and programmable gains in the IF amplifiers for any number of downrange distances. In a preferred embodiment, the downrange distances are from approximately 0–60 ft. In FIG. 6B, an output of the PRF generator 602 is provided to a first terminal of a SPST transmit enable switch 644 and to a clock input of a timing generator 643. The sensor enable signal 421 is provided to an enable input of the timing generator 643. A control output of the timing generator 643 is provided to a control input of the transmit enable switch 644.

A second terminal of the transmit enable switch 644 is provided to the transmit timing signal 410 and to an input of a programmable delay 646. The programmable delay 646 is programmed by inputs provided by the program enable signal 421, the program clock signal 424, and the program data in signal 426. hi a preferred embodiment, the programmable delay 646 can generate time delays from 0–118 ns, in 0.5 ns intervals, corresponding to downrange distances of approximately 0–59 ft.

The IF signal 414 is provided to an input of a lowpass filter 648. An output of the lowpass filter 648 is provided to an input of a DC-block 650. An output of the DC-block 650 is provided to an input of a first programmable gain amplifier 652 and to a first terminal of a SPST switch 660. The program enable signal 421 is provided through a 5 ms (millisecond) delay to a control input of the switch 660. A second terminal of the SPST switch 660 is connected to ground.

An output of the first programmable gain amplifier 652 is provided to an input of a second programmable gain amplifier 654. An output of the second programmable gain amplifier is provided to an input of a lowpass filter 656. An output of the lowpass filter 656 is the analog output signal 420. The first and second programmable amplifiers 652 and 654 are programmed by inputs provided by the program enable signal 421, the program clock signal 424, and the program data in signal 426.

In a preferred embodiment, the lowpass filter 648 has a rolloff frequency of approximately 500 Hz at a rate of 15 dB/decade and the lowpass filter 656 has a rolloff frequency of approximately 500 Hz at a rate of 15 dB/decade. The voltage gain of the first programmable gain amplifier 652 is preferably adjustable from 1 to 252 and the voltage gain of the second programmable gain amplifier 654 is preferably adjustable from 8 to 38.

Figure 7A:
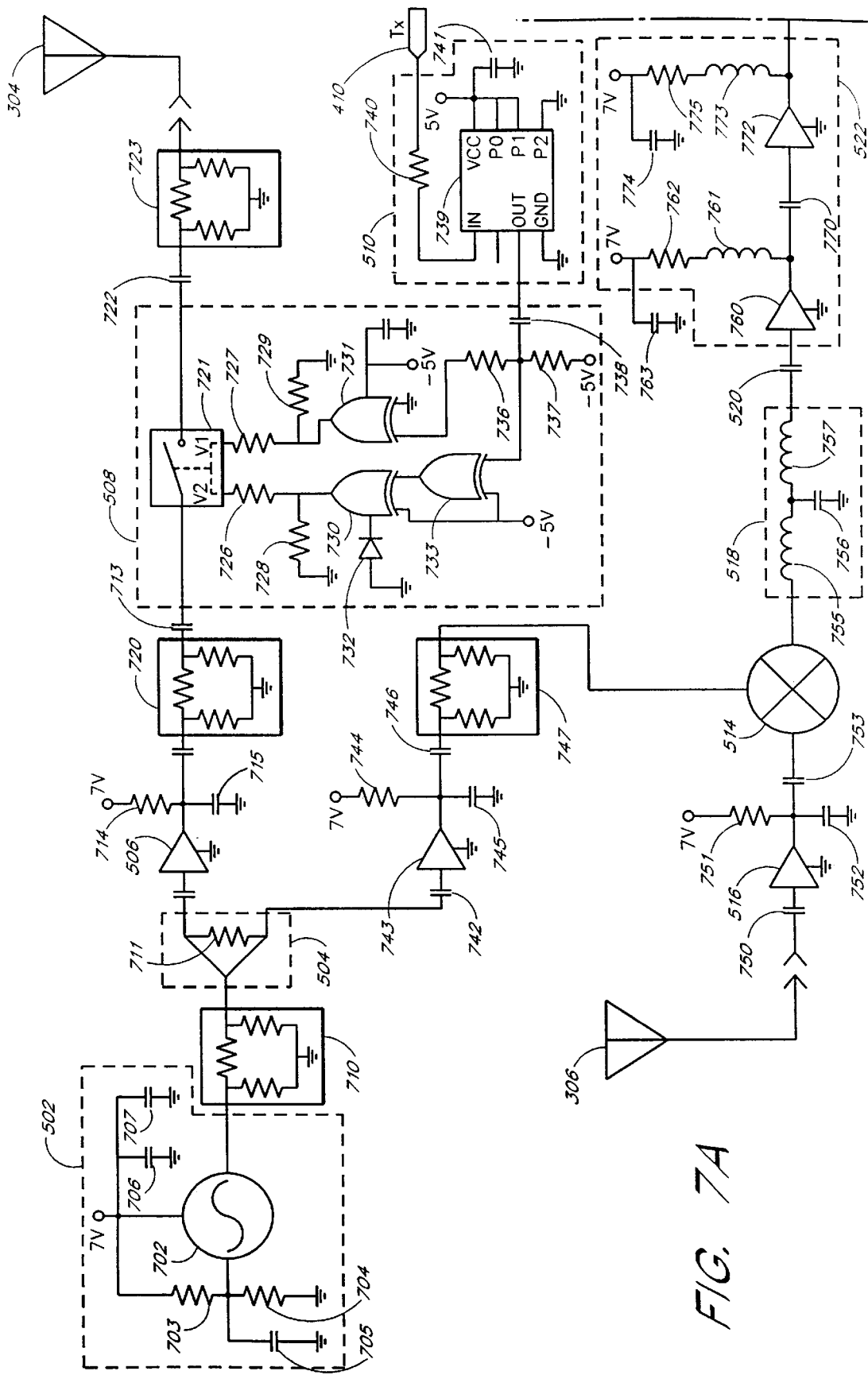

FIG. 7 is a circuit schematic of an RF section corresponding to the block diagram shown in FIG. 5. The carrier frequency oscillator 502 is based on a 5.8 GHz oscillator 702. A 7 volt supply is provided to a Vcc input of the oscillator 702, and the 7 volt supply is bypassed to ground at the oscillator by a capacitor 706 and a capacitor 707. The 7 volt supply is also provided to a first terminal of a resistor 703. A second terminal of the resistor 703 is connected to a first terminal of a resistor 704, to a first terminal of a capacitor 705, and to a bias terminal of the oscillator 702. An output of the oscillator 702 is the output of the carrier frequency oscillator block 502. In a preferred embodiment, the capacitor 706 is a 33 uF (microfarad) capacitor, the capacitor 707 is a 1 uF capacitor, the capacitor 705 is a 33 pF (picofarad) capacitor, the resistor 703 is an 11 kΩ resistor, the resistor 704 is a 39 kΩ resistor, and the oscillator 702 is a Voltage Controlled Oscillator (VCO) manufactured by MODCO.

The output of the oscillator 702 is provided to a first terminal of a resistive matching network 710. A second terminal of the resistive matching network 710 is connected to an input of the power divider 504. In a preferred embodiment, the power divider 504 is a single stage Wilkinson power divider with a resistor 711 of 100 Ω. An output of the power divider 502 is provided through a DC-blocking capacitor 712 to an input of the amplifier 506. An output of the amplifier 506 is connected to the 7 volt supply by a resistor 714, to ground by a capacitor 715, and through a DC-blocking capacitor 716 to a first terminal of a matching network 720. The switch 508 comprises a solid state switch 721. A second terminal of the matching network 720 is connected through a DC-blocking capacitor 713 to a first terminal of the solid state switch 721. A second terminal of the solid state switch 721 is connected through a DC-blocking capacitor 722 to a first terminal of a matching network 723. A second terminal of the matching network 723 is connected to the transmit antenna 304.

In a preferred embodiment, the impedance matching networks 710, 720, and 723 are PI network attenuators with an attenuation range of 0 dB–10 dB. The DC-blocking capacitors 712, 716, 713, and 722 are 33 pF capacitors. The resistor 714 is a 64 Ω resistor and the capacitor 715 is a 33 pF capacitor. The solid state switch is preferably an AS006M1-16 supplied by Alpha.

The pulse generator 510 comprises a delay line 739. The transmit timing signal 410 is provided through a resistor 740 to a data input of the delay line 739. A 5 volt supply voltage is provided to a Vcc input, a P0 input, and a P1 input of the delay line 739. A ground is provided to a P2 input and a ground input of the delay line 739. In a preferred embodiment, the delay line 739 is a DS1040 from Dallas Semiconductor Corp.

An output of the delay line 739 is provided through a DC-blocking capacitor 738 to a first terminal of a resistor 736, to a first terminal of a resistor 737, and to a first input of an xor (exclusive-or) gate 733. A −5.0 volt supply voltage is provided to a second terminal of the resistor 737, to a second input of the xor gate 733, and to a first input of an xor gate 730. An output of the xor gate 733 is provided to a second input of the xor gate 730. An output of the xor gate 730 is provided through a resistor 726 to a V2 control input of the solid state switch 721. The output of the xor gate 730 is also connected to ground by a resistor 728. A bias input of the xor gate 730 is connected to the cathode of a diode 732 and the anode of the diode 732 is connected to ground.

A second terminal of the resistor 736 is connected to a first input of an xor gate 731. A second input of the xor gate 736 is connected to ground and a bias input of the xor gate 736 is connected to ground. An output of the xor gate 731 is provided through a resistor 727 to a V1 control input of the solid state switch 721. The output of the xor gate 731 is also connected to ground by a resistor 729.

In a preferred embodiment, the resistors 737, 728, and 729 are 1 kΩ resistors, the resistor 736 is a 0 Ω resistor, the resistors 726 and 727 are 10 Ω resistors, and the diode 732 is replaced by a 0 Ω resistor. The xor gates 730, 731, and 733 are preferably 74AC86 types.

A second output of the power divider 504 is provided through a DC-blocking capacitor 742 to an amplifier 512. An output of the amplifier 512 is provided to the 7 volt supply by a resistor 744, to ground by a capacitor 745, and through a DC-blocking capacitor 746 to a first terminal of a matching network 747. A second terminal of the matching network 747 is provided to the LO input of the mixer 514.

The output of the receive antenna 306 is provided through a DC-blocking capacitor 750 to an input of the amplifier 515. An output of the amplifier 516 is provided to the 7 volt supply by a resistor 751, to ground by a capacitor 752, and through a DC-blocking capacitor 753 to the RF input of the mixer 514.

In a preferred embodiment, the capacitors 750, 751, and 752 are 33 pF capacitors, and the resistor 751 is a 220 Ω resistor. The amplifier 516 is preferably an MGA-86363 2–8 GHz amplifier supplied by Hewlett-Packard and the mixer 514 is an HMC168C8 supplied by Hitite.

The output of the mixer 514 is provided to a first terminal of an inductor 755. A second terminal of the inductor 755 is connected to ground through a capacitor 756 and to a first terminal of an inductor 757. A second terminal of the inductor 757 is connected through the DC-blocking capacitor 520 to an input of an amplifier 760. An output of the amplifier 760 is provided to a first terminal of an inductor 761 and to a DC-blocking capacitor 770. A second terminal of the inductor 761 is connected through a resistor 762 to the 7 volt supply.

In a preferred embodiment, the inductors 755 and 757 are 90 nH inductors, the capacitor 756 is a 3 pF capacitor, and the DC-blocking capacitor 520 is a 1 uF capacitor. The amplifier 760 is preferably a VAM-6 supplied by Mini-Circuits. The inductor 761 is a 47 nH inductor and the resistor 762 is a 220 Ω resistor.

The output of the amplifier 760 is also connected through a DC-blocking capacitor 770 to an input of an amplifier 772. An output of the amplifier 772 is provided to a first terminal of an inductor 773 and to a DC-blocking capacitor 776. A second terminal of the inductor 773 is connected through a resistor 775 to the 7 volt supply.

The amplifier 772 is preferably a VAM-3 supplied by Mini-Circuits. In a preferred embodiment, the inductor 773 is a 47 nH inductor and the resistor 775 is a 65 Ω resistor.

The switch 524 comprises a solid state switch 777. An output of the amplifier 772 is provided through a DC-blocking capacitor 776 to a first terminal of the solid state switch 777 and a second terminal of the solid state switch 777 is provided to the IF signal 414. The second terminal of the solid state switch 777 is also provided to ground through a capacitor 790. The receive timing signal 412 is provided through a resistor 526 to a data input terminal of a delay line 785. The 5 volt supply is provided to a Vcc input and to a P0 input of the delay line 785. The ground is provided to a P1 input, to a P2 input, and to a ground input of the delay line 785. An output data terminal of the delay line 785 is provided to a first input of an xor gate 782 and to a first input of an xor gate 783. A second input of the xor gate 782 is provided to ground, and a second input of the xor gate 783 is provided to the 5 volt supply. An output of the xor gate 782 is provided through a capacitor 781 to a first control input of the solid state switch 777. An output of the xor gate 783 is provided through a capacitor 780 to a second control input of the solid state switch 777. The 5 volt supply is also provided through a resistor 778 to the first control input of the solid state switch 777. A ground is also provided through a resistor 779 to the second control input of the solid state switch 777.

In a preferred embodiment, the resistor 784 is a 0 Ω resistor, the resistors 778 and 779 are 1 kΩ resistors, and the capacitors 781, 780, and 790 are 1000 pF capacitors. The delay line 785 is preferably a DS1040, the solid state switch 777 is an SW239 switch supplied by M/A Com, and the xor gates 782 and 783 are 74AC86 types.

Figure 8A:
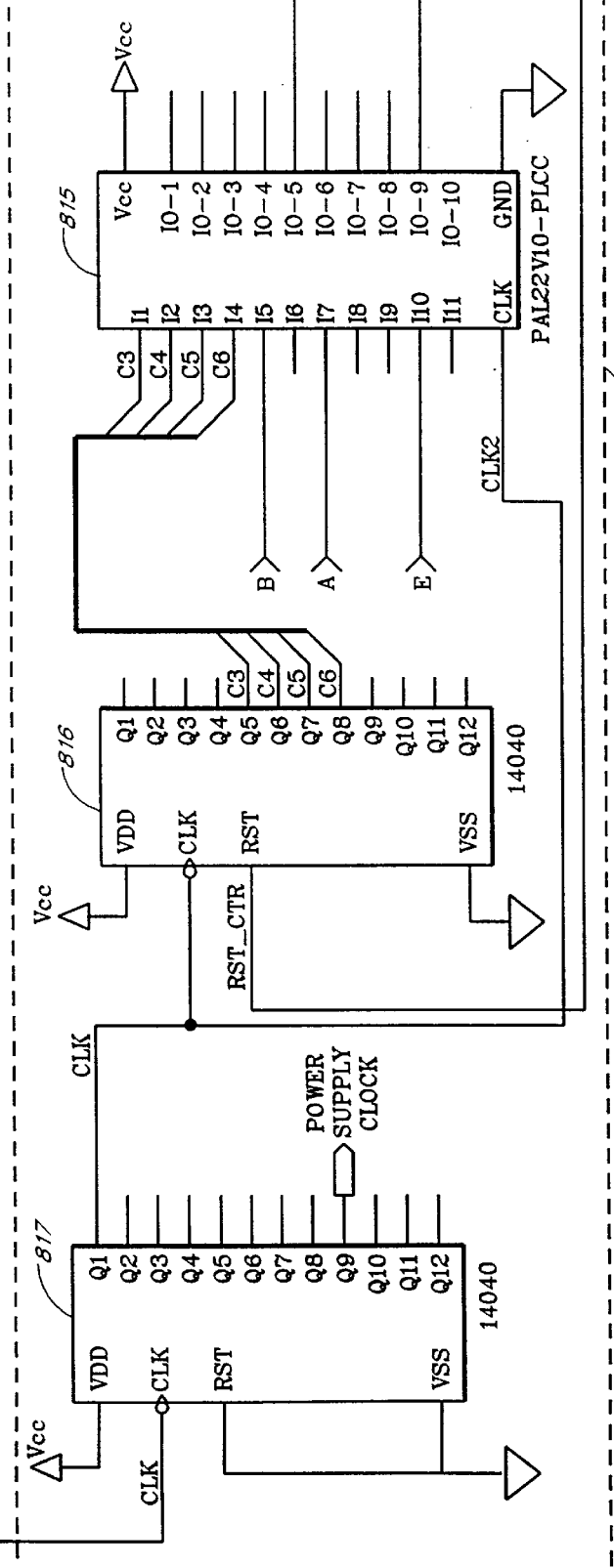
FIGS. 8A–8D, is a circuit schematic of the analog section corresponding to the block diagram shown in FIG. 6B.
Figure 8:
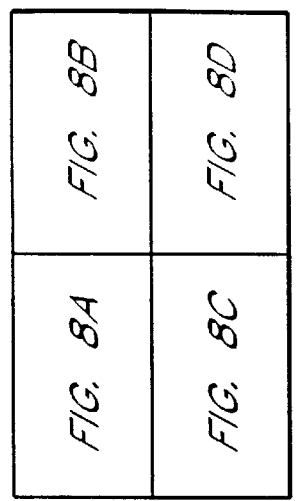
FIG. 8, comprising
Figure 8B:
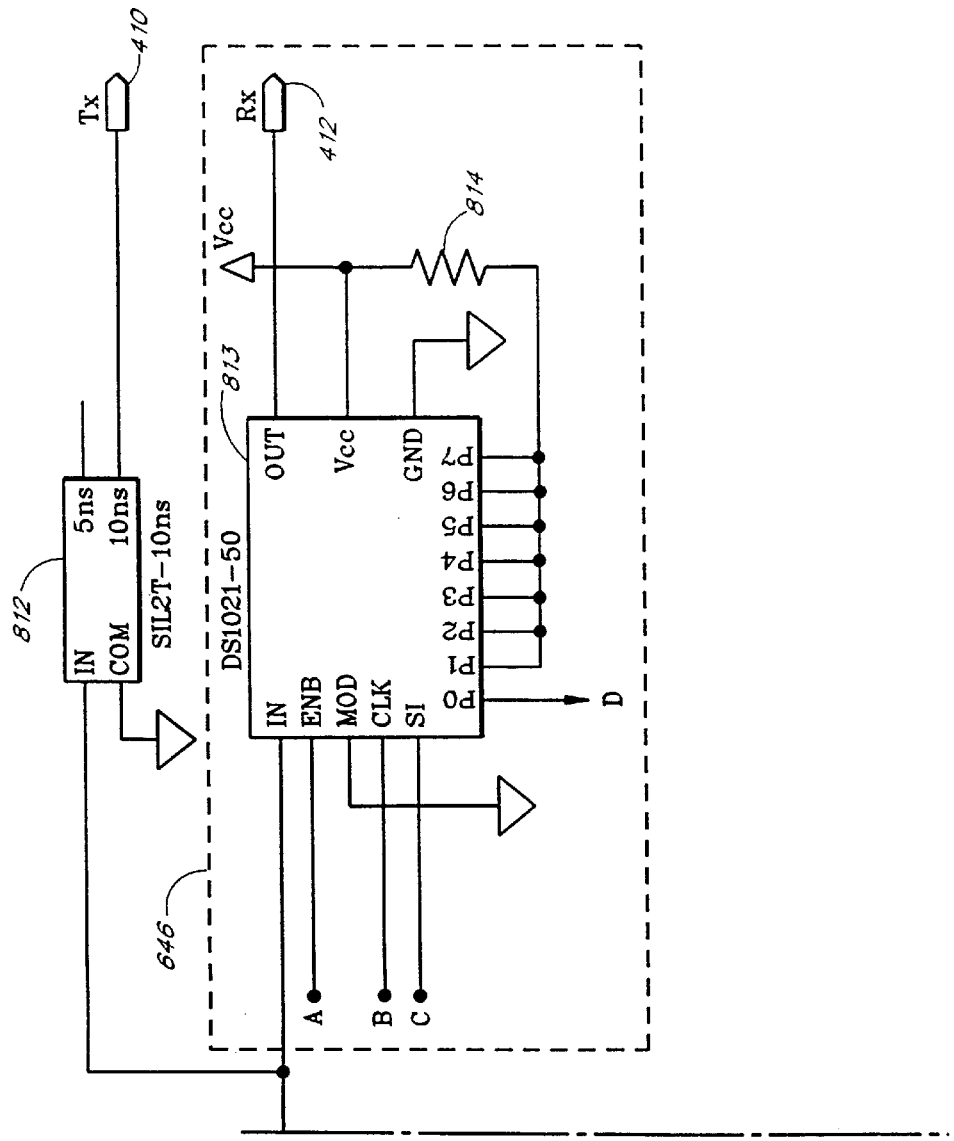
Figure 8C:
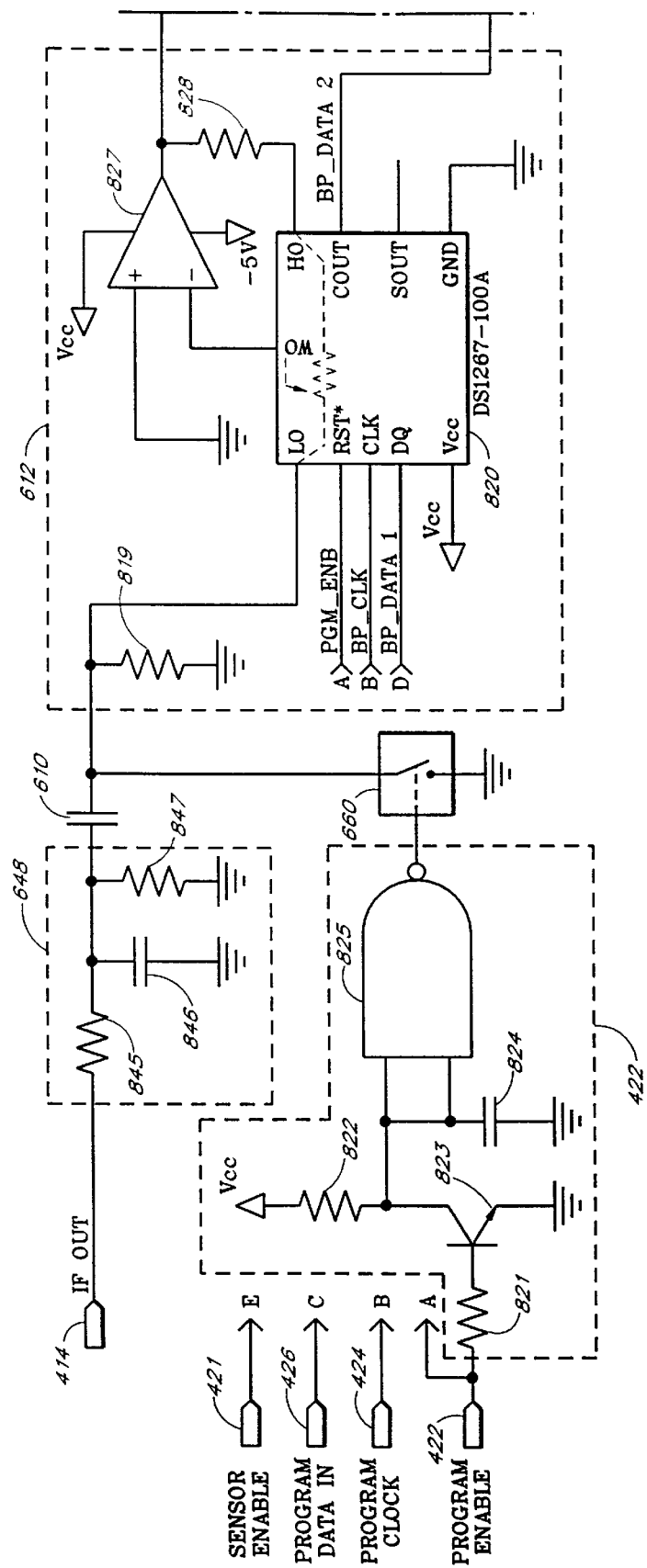
Figure 8D:
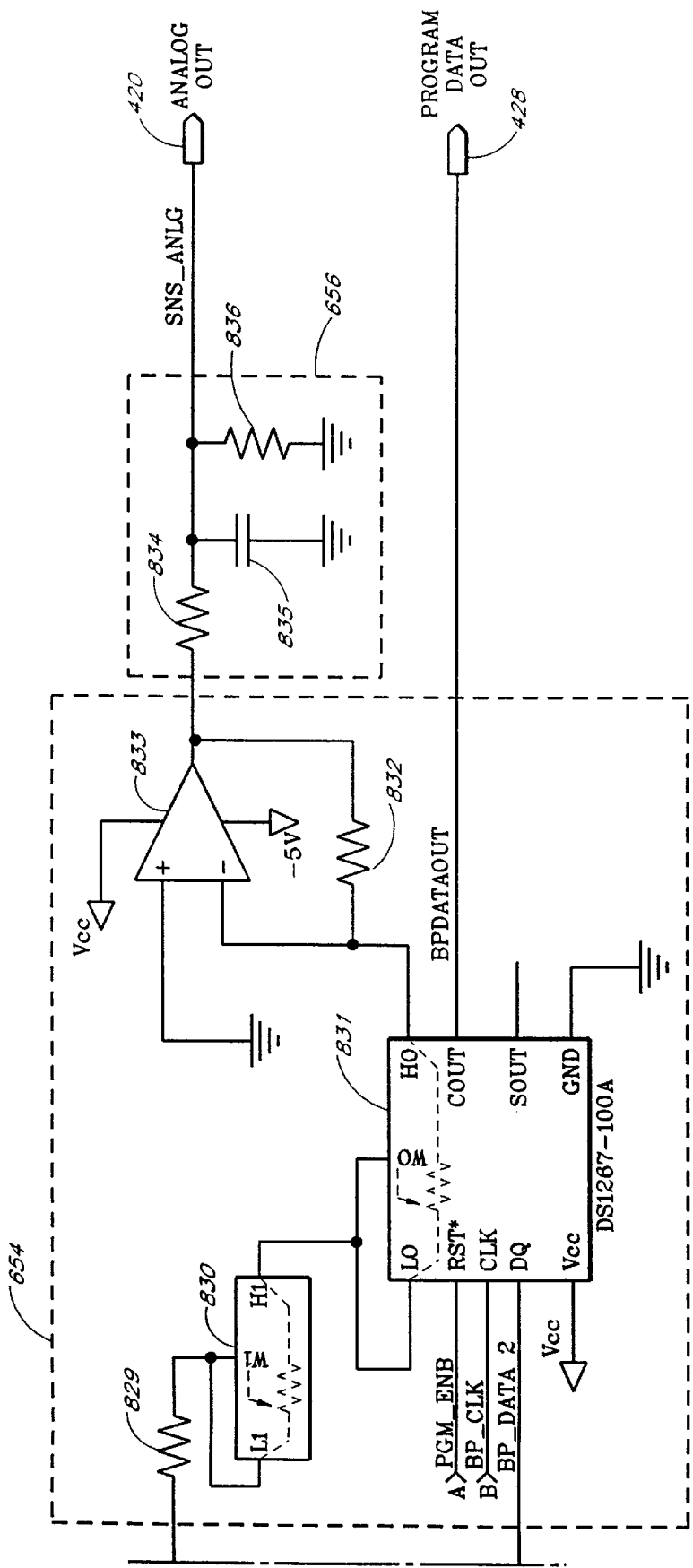

FIG. 8 is a circuit schematic of an analog section 404 corresponding to the block diagram shown in FIG. 6B. FIG. 8 shows the PRF generator 642 comprising an inverter 807, an inverter 806, and an inverter 804. An output of the inverter 807 is provided to a first terminal of a resistor 803 and to an input of the inverter 806. An output of the inverter 806 is provided to a first terminal of a capacitor 808 and to an input of the inverter 804. A second terminal of the capacitor 808 is provided to a second terminal of the resistor 803 and to a first terminal of a resistor 809. A second terminal of the resistor 809 is provided to an input of the inverter 807.

In a preferred embodiment, the resistor 809 is a 620 Ω resistor, the resistor 803 is a 62 Ω resistor, and the capacitor 808 is a 1000 pF capacitor.

An output of the inverter 804 is provided to a first terminal of a pull-up resistor 805, to a first input of a nand gate 810, and to a clock input of a first counter 817. A VDD input of the first counter 817 is connected to a 5 volt supply voltage Vcc. An RST and a VSS input of the first counter 817 are connected to ground. A Q1 output of the counter 817 is provided to a clock input of a second counter 816 and to a clock input of a programmable array logic device (PAL) 815. A VDD input of the second counter 816 is connected to a 5 volt supply voltage Vcc and a VSS input of the second counter 817 is connected to ground. Outputs Q5–Q8 of the second counter 816 are provided to inputs I1–I4, respectively, of the PAL 815. The program clock signal 424 is provided to an input I5 of the PAL 815, the program enable signal 422 is provided to an input I7 of the PAL 815, and the sensor enable signal 421 is provided to an input I10 of the PAL 815. A transmit enable output (on pin IO-5) of the PAL 815 is provided a second input of the nand gate 810 and a reset output (on pin IO-9) of the PAL 815 is provided to a reset input of the second counter 816.

In a preferred embodiment, the first and second counters 817 and 816 are 14040 12-bit counters supplied by National and the PAL 815 is a PAL22V10-PLCC supplied by Lattice. The PAL 815 is programmed according to a PAL source program given in Table 1.

An output of the nand gate 644 is provided to a pull-up resistor 811, to a data input of a fixed time delay 812, and to a data input of programmable time delay 813. A COM signal on the fixed time delay 812 is provided to ground and a 10 ns delay output of the fixed delay 813 is provided to the transmit timing signal 410. Outputs P1–P7 of the programmable time delay 813 are connected together and pulled up to Vcc by a pull-up resistor 814. A MOD input of the programmable delay 813 is provided to ground. The program enable signal 422 is provided to a program enable input of the delay 813. The program clock signal 424 is provided to a program clock input of the delay 813. The program enable data in 426 is provided to a program data input of the delay 813.

In a preferred embodiment, the pull-up resistors 811 and 814 are each 1 kΩ resistors. The fixed delay 812 is preferably a SIL2T-10 ns supplied by Rhombus and the programmable delay 813 is a DS1021-50 supplied by Dallas Semiconductor.

The delay 813 is a programmable 8-bit silicon delay line. Delay values can be varied over 256 equal steps with an incremental delay of 0.5 ns. The output of the delay 813 will substantially reproduce the logic state of the input after a delay time determined by an 8-bit value clocked into the data input of the delay 813. When the program enable signal 422 is at a logic high, timing data is loaded in MSB (most significant bit) to LSB (least significant bit) order by the rising edge of the program clock signal 424. As timing values are shifted into the program data input of the delay 813, the previous contents of the 8-bit input are shifted out of the program data output in MSB-to-LSB order.

The program enable signal 422 is provided through a series resistor 821 to the base of a transistor 823. The emitter of the transistor 823 is provided to ground. The collector of the transistor 823 is connected to Vcc by a resistor 422, to first and second inputs of a 2-input nand gate 825 and to ground by a capacitor 824. An output of the nand gate 825 is provided to a control input of a SPST switch 660. A second terminal of the SPST switch 660 is connected to ground.

In a preferred embodiment, the resistors 821 and 822 are 4.7 kΩ resistors, the transistor is a 2N2222, the capacitor 824 is a 1 uF capacitor, the nand gate is a 74AC00, and the SPST switch 660 is a CD4066.

The IF signal 414 is provided to the lowpass filter 648 comprising a resistor 845, a capacitor 846, and a resistor 847. The IF signal 414 is provided to a first terminal of the resistor 845 and the second terminal of the resistor 845 is provided to a first terminal of the capacitor 846, to a first terminal of the resistor 847, and to a first terminal of a DC-blocking capacitor 610. A second terminal of the capacitor 846 and a second terminal of the resistor 847 are both provided to ground. A second terminal of the DC-blocking capacitor 610 is provided to a first terminal of the SPST switch 660, to a first terminal of a resistor 819, and to a first fixed terminal (also called the LO terminal) of a programmable potentiometer 820. A second fixed terminal (also called the HO terminal) of the programmable potentiometer 820 is provided through a series resistor 828 to an output of a first operational amplifier (op-amp) 827. A non-inverting input of the op-amp 827 is provided to ground and an inverting input of the op-amp 827 is provided to a wiper terminal (W0) of the programmable potentiometer 820.

The program enable signal 422 is provided to a program enable input of the potentiometer 820. The program clock signal 424 is provided to a program clock input of the potentiometer 820 and the program enable data in signal 426 is provided to a program data input of the potentiometer 820. A program data output from the delay line 813 is provided to a program data input of the potentiometer 820.

In a preferred embodiment, the resistor 845 is a 100 Ω resistor, the capacitors 846 and 610 are 1 uF capacitors, the resistors 847 and 819 are 4.7 kΩ resistors, and the resistor 828 is a 100 kΩ resistor. The op-amp 827 is preferably an LM2902 supplied by National Semiconductor. The potentiometer 820 is a DS1267-100A (100 kΩ) supplied by Dallas Semiconductor. The DS1267-100A is a dual potentiometer, having a first potentiometer 820 with terminals L0, W0, and H0 and a second potentiometer 830 with terminals L1, W1, and H1. Each of the dual potentiometers are separately programmable.

The programmable resistor 820 in combination with the op-amp 827 comprise the first programmable gain stage 612. The programmable potentiometer 820 is similar to a mechanical potentiometer with a first fixed terminal (LO) a second fixed terminal (HO) and a wiper (WO). The location of the wiper WO is programmed by asserting the program enable signal 422 and using the program clock 424 to clock data from the program data in signal 426 into a shift register inside the programmable potentiometer 820. The programmable potentiometer 820 is composed of 256 resistive sections. Between each resistive section and both ends of the potentiometer are tap points that are accessible to the wiper. The position of the wiper on the resistive array is set by an 8-bit value that controls which tap point is connected to the wiper output. The programmable potentiometer 820 is programmed in a manner similar to the programmable delay line 813. By connecting the program data output of the delay 813 to the program data input of the potentiometer 820, multiple devices can be daisy-chained (cascaded) for programming purposes. The programmable potentiometer 820 is programmed by a 17-bit word comprising: an 8-bit value for wiper W0; an 8-bit value for wiper W1; and a 1-bit stack select bit (the stack select bit is not used the preferred embodiment).

The output of the op-amp 827 is provided through a resistor 829 to a wiper (W1) of the programmable potentiometer 830. The potentiometers 820 and 830 are part of a dual unit so the programming lines used to program the potentiometer 820 are also used to program the potentiometer 830. A fixed terminal H1 of the potentiometer 830 is connected to a wiper (W0) of a programmable potentiometer 831.

A program data output from the potentiometer 820 is provided to a program data input of the programmable potentiometer 831. The program enable signal 422 is provided to a program enable input of the potentiometer 831 and the program clock signal 424 is provided to a program clock input of the potentiometer 831. A fixed output (H0) of the potentiometer 831 is provided to an inverting input of a second op-amp 833. A non-inverting input of the second op-amp 833 is provided to ground. A feedback resistor 832 is connected between the inverting input of the second op-amp 833 and to an output of the second op-amp 833. The combination of the second op-amp 833, the programmable potentiometer 830, the programmable potentiometer 831, and the feedback resistor 832 comprises the second programmable gain stage 654.

In a preferred embodiment, the programmable potentiometer 831 is a DS1267, the feedback resistor 832 is a 2 MΩ (megaohm) resistor, and the second op-amp 833 is an LM2902.

An output of the second op-amp 833 is provided to a first terminal of a resistor 834. A second terminal of the resistor 834 is provided to a first terminal of a capacitor 835, to a first terminal of a resistor 836, and to the analog out signal 420. A second terminal of the capacitor 835 and a second terminal of the resistor 836 are provided to ground. The combination of the capacitor 835 and the resistors 834 and 836 comprises the lowpass filter 656.

In a preferred embodiment, the capacitor 835 is a 1 uF capacitor, the resistor 834 is a 100 Ω resistor, and the resistor 836 is a 4.7 kΩ resistor.

TABLE 1

PAL Source Program

1. MODULE ANALOG3
2. TITLE 'Analog Board Control Logic'
3. "AN3CTL device 'p22v10';
4. "Constants
5. C,P,X = .c., .p.,.x.;
6.
7. "Inputs
8. CLK                        pin 2;
9. C3,C4,C5,C6                pin 3,4,5,6;
10. BPClk                     pin 7;
11. RF_Data_                  pin 9;
12. Pgm_Enb                   pin 10;
13. "PS0,PS1                  pin 11,12;
14. Sns_Enb_                  pin 13;
15. Rst_RFD_                  pin 16;
16.
17. "Outputs
18. "RF_Detect                pin 17 istype 'reg,buffer';
19. "Sns_Act                  pin 18 istype 'reg,buffer';
20. "LSns_Go                  pin 19 istype 'reg,buffer';
21. "LSns_Go1                 pin 20 istype 'reg,buffer';
22. Tx_Enb                    pin 21 istype 'reg,buffer';
23. "RF_Sample                pin 23 istype 'reg,buffer';
24. LPgm_Enb                  pin 24 istype 'reg,buffer';
25. "Hold_1267                pin 25 istype 'reg,buffer';
26. "Tmr_Clk                  pin 25 istype 'reg,buffer';
27. Rst_Ctr                   pin 26 istype 'reg,buffer';
28. Init_Sns_                 pin 27 istype 'reg,buffer';
29.
30. "     COUNT.AR = RST;
31.
32. "Set Declarations
33.
34. "State Declarations
35.
36. equations
37.
38. Init_Sns_.C = CLK;
39. Tx_Enb.C = CLK;
40. Rst_Ctr.C = CLK;
41. Hold_1267.C = CLK;
42. LPgm_Enb.C = CLK;
43. !Init_Sns_ := Init_Sns_ & !Init_Sns_;
44. Tx_enb := !Sns_enb_;
45. Rst_Ctr := LPgm_Enb;
46. Hold_1267 := LPgm_Enb;

TABLE 1-continued

PAL Source Program

47. # !LPgm_Enb & Hold 1267 & !C6;
48. LPgm_Enb := Pgm_Enb;
49.
50. End

Figure 9:
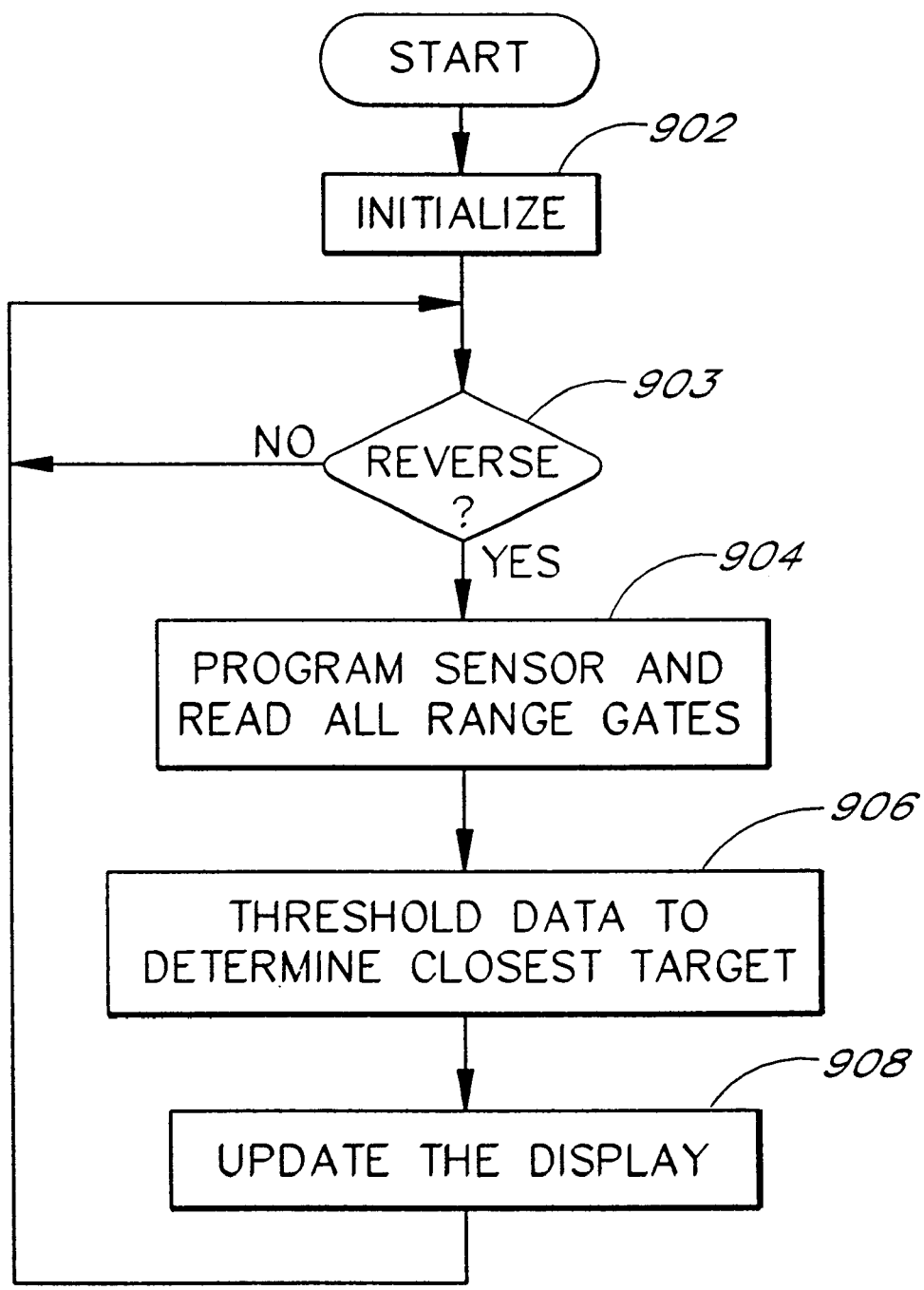
FIG. 9 is a high level flowchart showing operation of the radar system.

FIG. 9 is a high level flowchart showing operation of the controller 406. The process shown in the flowchart of FIG. 9 begins at an initialization process block 902 where the controller initializes the radar system hardware, data structures, and the controller interrupt structure. Hardware initialization includes initializing the RF section 402, the analog section 404, and the controller 406. After initialization, the process advances to a decision block 903 where the controller determines whether or not the vehicle 100 is in reverse. If the vehicle is in reverse, then the process advances to a process block 904. If the vehicle is not in reverse then the process re-enters the decision block 903.

Figure 10:
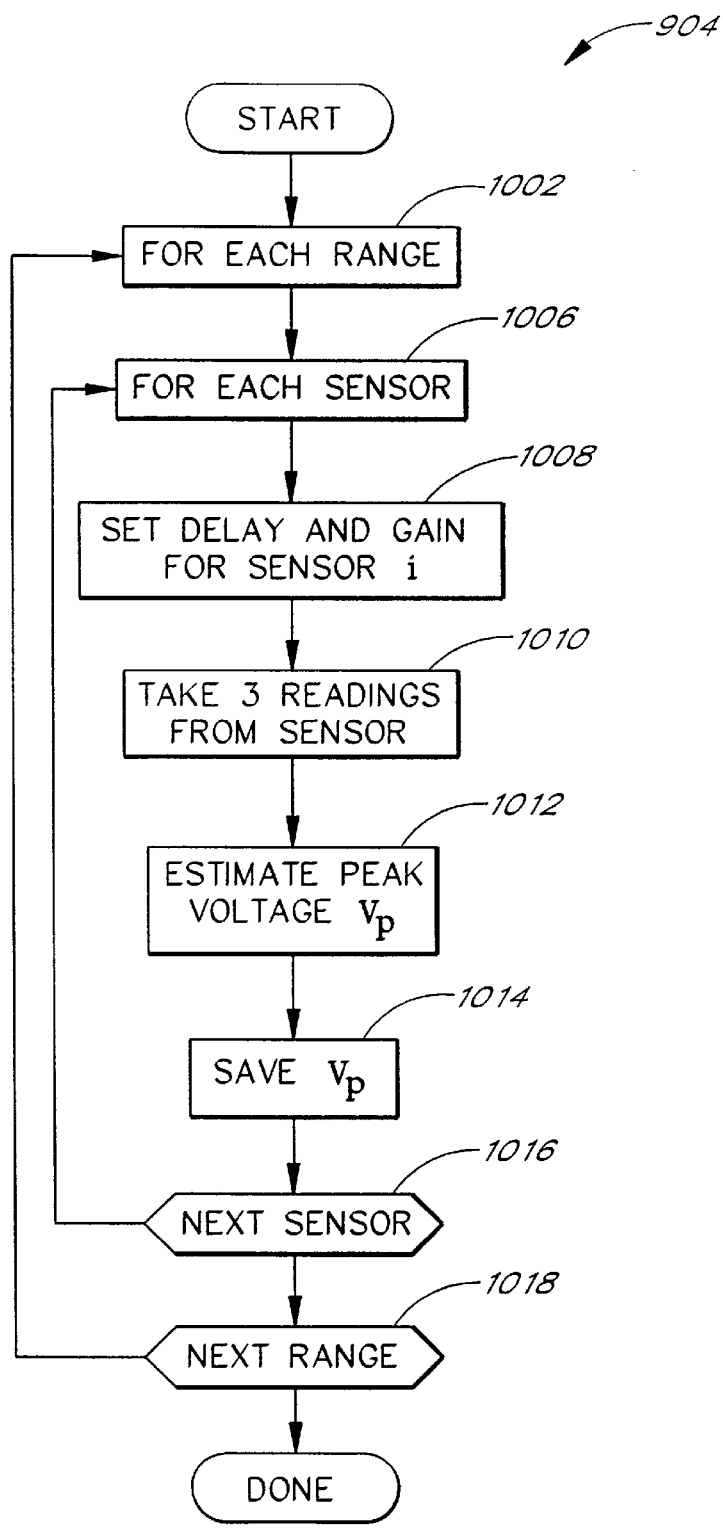
FIG. 10 is a flowchart showing the crossrange and downrange target search algorithm.

In the process block 904, the controller 406 collects radar target data according to the flowchart shown in FIG. 10. Upon completion of the process block 904, the process advances to a process block 906 where the controller analyzes the target data according to the flowchart shown in FIG. 11. Upon completion of the process block 906, the process advances to a process block 908 where the controller updates the display 224 according to the flowchart shown in FIG. 12. Upon completion of the process block 908, the process jumps back to the decision block 903.

As shown in the flowchart of FIG. 9, whenever the vehicle is in reverse, the controller 406 continuously collects radar target data from one or more analog sections (such as the analog section 404), analyzes the collected data, and updates the display 224 based on the results of the data analysis.

FIG. 10 is a flowchart showing the data collection process which includes a search for targets in both crossrange and downrange directions. The search begins with a loop process block 1002 where a downrange distance D is selected. The process then advances to a loop process block 1006 where a radar sensor S (comprising an analog section 404) is selected. Having selected a downrange distance and a sensor, the process advances to a process block 1008 where a time delay, corresponding to the distance D, is programmed into the programmable time delay 646 in the sensor S. Also in the process block 1008, a desired gain is programmed into the analog section 404. The desired gain is programmed by programming the programmable potentiometers 820, 830, and 831. Once the delay and gain have been programmed, the process advances to a process block 1010 where target data is obtained. Target data is obtained by asserting the sensor enable signal 421 and then sampling target data (using the ADC) on the analog signal line 420. In a preferred embodiment, three samples are obtained.

The sampled target data (e.g., three samples) are passed to a process block 1012 where a peak target voltage Vp is estimated. In general, the analog signal 420 exhibits an oscillatory behavior that approximates a sine wave for time periods of a few cycles. An estimate of the peak value Vp of the analog signal 420 is obtained from the data obtained in the process block 1010. In a preferred embodiment, the estimate of the peak value is obtained by selecting the largest sample obtained in the process block 1010. Thus, in a preferred embodiment, $Vp = \max(S_1, \ldots S_N)$ where $S_1$ is the first sample, $S_N$ is the last sample, and N=3. In an alternative embodiment, the value of Vp is obtained by parameter estimation of a sine wave using three samples $S_1$, $S_2$ and $S_3$ at times $t_1$, $t_2$ and $t_3$ respectively. The amplitude A of the estimated sine wave may be calculated by the equation $$A = \sqrt{S_2 + \dot{S}_2^2 S_2 / \ddot{S}_2}$$

where $$\dot{S}_2 = \frac{S_3 - S_1}{t_3 - t_1}$$

and $$\ddot{S}_2 = -\frac{\frac{S_2 - S_1}{\Delta t} - \frac{S_3 - S_2}{\Delta t}}{\Delta t}$$

where $\Delta t = t_3 - t_2 = t_2 - t_1$. The frequency of the estimated sine wave can be a calculated by the equation $$\omega = \sqrt{\ddot{S}_2 / S_2} .$$

The estimated relative target velocity with respect to the radar is proportional to the frequency of the estimated sine wave and thus target velocity can be computed from the estimated frequency. The relative target acceleration with respect to the radar may be computed by using two successive estimates of the estimated velocity.

Once the value of Vp has been determined in the process block 1012, the process advances to a process block 1014 where Vp is stored in a database for later use by the data analysis process shown in FIG. 11. The process then advances to a loop test block 1016 which selects the next sensor. When the sensor loop, comprising the process blocks 1006 and 1016 has looped through all sensors, then the process advances to a loop test block 1018 which selects the next downrange distance. The process is complete when the downrange loop, comprising the process blocks 1002 and 1018, has looped through all of the downrange distances.

Figure 11:
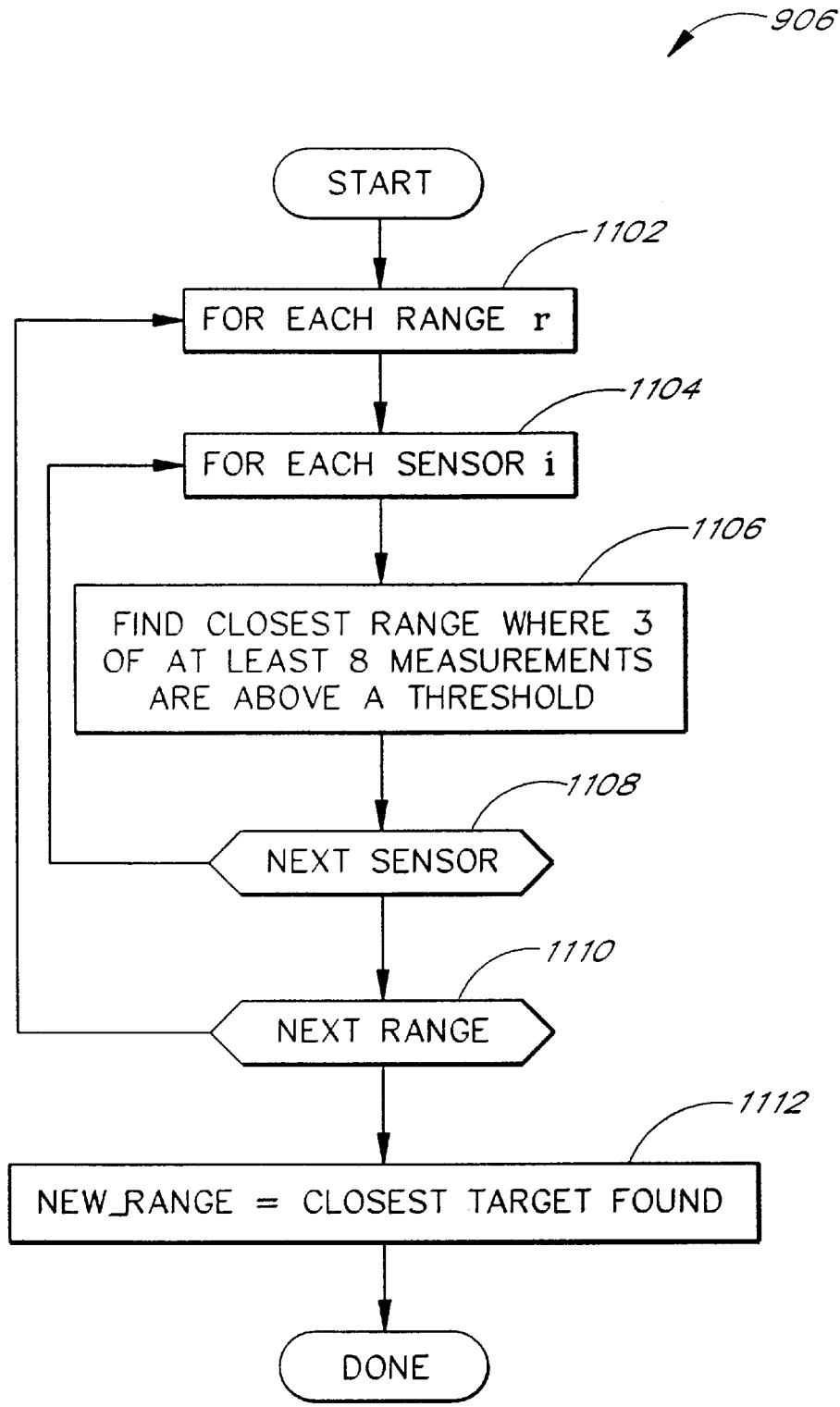
FIG. 11 is a flowchart showing the false target detection algorithm.

FIG. 11 is a flowchart showing the data analysis process, which includes a false target detection algorithm. The database generated by the flowchart of FIG. 10 comprises a set of values Vp(r,s,k), where r is an index which selects the downrange distances, s is an index which selects a sensor, and k=1 . . . N is an index which selects the last N values of Vp(r,s). The data analysis flowchart of FIG. 11 begins at loop process block 1102 where a downrange index r is selected. The process then advances to a loop process block 1104 where a sensor index s is selected. Having selected r and s, the process advances to a process block 1106 where the vector Vp(r,s, 1 . . . N) is scanned for a target. A target is determined to exist if the vector Vp(r,s, 1 . . . N) contains at least M values above a preset threshold. In a preferred embodiment N=8 and M=3. Thus, the controller decides that a target was detected at the range r, by the sensor s, if 3 of the last 8 Vp values obtained were above the threshold.

The process then advances to a process to a loop test block 1108 which selects the next sensor index s. When the sensor loop, comprising the process blocks 1108 and 1104 in has looped through all sensors, the process advances to a loop test block 1110 which selects the next downrange distance index r. When the downrange loop, comprising the process blocks 1110 and 1102, has looped through all of the range indexes r, the process advances to a process block 1112. In the process block 1112 the current target distance NEW__RANGE corresponding to a target (found in the process block 1106) having the smallest downrange distance is selected and the process ends.

Figure 12:
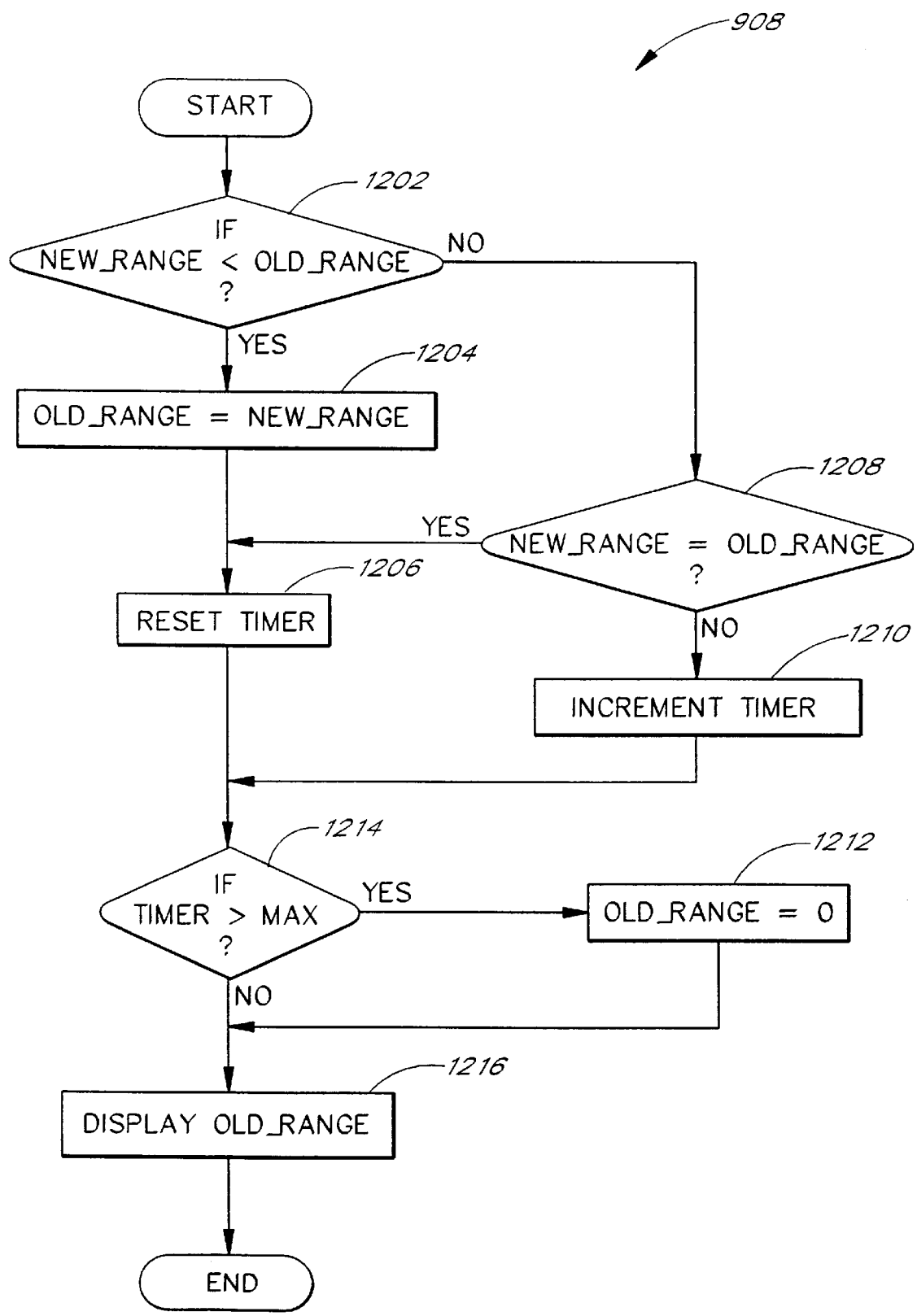
FIG. 12 is a flowchart showing the display update algorithm.

FIG. 12 is a flowchart showing the display update process beginning with a decision block 1202 where NEW__RANGE is compared to OLD__RANGE (the previous target distance). If NEW__RANGE is less than OLD__RANGE, then the process advances to a process block 1204; otherwise, the process advances to a process block 1208. In the process block 1204 the value of OLD__RANGE is set to NEW__RANGE and the process advances to a process block 1206. In the process block 1208, the value of NEW__RANGE is again compared to OLD__RANGE. If NEW__RANGE is equal to OLD__RANGE, then the process advances to the process block 1206; otherwise, the process advances to a process block 1210.

The display update is based on a display timer. In the process block 1206 the display timer is reset and the process advances to a decision block 1214. In the process block 1208, the display timer is incremented and the process advances to the decision block 1214. In the decision block 1214, the value of the display timer is checked. If the display timer is greater than a maximum, then the process advances to a process block 1212, otherwise; the process advances to a process block 1216. In the process block 1212, the value of OLD__RANGE is set to infinity and the process advances to the process block 1216. In the process block 1216, the value of OLD__RANGE is sent to the display 224 and the process ends.

Other Embodiments

While certain specific embodiments of the present invention have been described, these embodiments have been presented by way of example only, and are not intended to limit the scope of the present invention.

The operating frequency of the Radio Frequency source 502 may be changed to operate at different frequencies, including for example, frequencies near 36 GHz, 77 GHz, 94 GHz, etc. The operating frequency of the PRF generator 602 may also be changed to other frequencies. The width of the transmitted pulses of RF energy may be altered and the width of the receive window may be altered.

The visual displays may use any suitable display technology, including, for example, incandescent lamps, light emitting diodes, liquid crystal displays, plasma displays, etc. The audio displays may be constructed using any suitable sound producing technology, including, for example, piezoelectric transducers, loudspeakers, etc.

Although described primarily in terms of a backup or side-object warning radar, the radar system described herein is also useful in many other vehicle applications. For example, the present radar may be used inside a passenger compartment: as part of an airbag deployment system; as part of a throttle position system; an active suspension system; etc. The radar system described herein may also be used in other non-vehicle applications, including, for example, home security systems, automatic door opening systems, elevator systems, crossing-light systems, watercraft, aircraft, mobile robots, spacecraft, planetary explorer robots, etc.

Accordingly, the breadth and scope of the present invention should be defined only in accordance with the following claims and their equivalents.

What is claimed is:

1. An automotive radar capable of tracking and discriminating at least two Doppler shifted targets, said radar comprising:

a radio frequency oscillator;

a transmit pulse generator;

a transmit antenna;

a transmit switch, said transmit switch configured to connect said oscillator to said transmit antenna, said transmit switch operated by an output of said transmit pulse generator;

a receive antenna configured to provide received signals to a downconverter;

a programmable time delay;

a programmable gain amplifier;

a receive switch, an input of said receive switch connected to an output of said downconverter and an output of said switch connected, to an input of said programmable gain amplifier, said switch controlled by an output of said programmable time delay; and a controller operably connected to said transmit pulse generator, said programmable time delay, and said programmable gain amplifier, said controller configured to search for targets at a plurality of downrange regions, for each, downrange region, said controller configured to:

set a time delay for said programmable time delay;

set a gain for said programmable gain amplifier; and trigger said transmit pulse generator.

2. The automotive radar of claim 1, further comprising a visual display configured to display downrange information about targets detected by said radar.

3. The automotive radar of claim 2, wherein said visual display is configured to display information about the target which is closest to said radar.

4. The automotive radar of claim 2, wherein said visual display is configured to display information about targets with a shortest time to impact to said radar.

5. A radar system capable of tracking and discriminating multiple Doppler shifted targets in crossrange and downrange, said radar system comprising:

a plurality of sensor units, each sensor unit comprising a radio frequency transmitter, a radio frequency receiver, a programmable time delay and a programmable gain amplifier; and a controller unit, said controller unit operably connected to each of said sensor units such that said controller unit cart program said programmable time delay and said programmable gain amplifier.

6. The radar system of claim 5 wherein said controller is further configured to use each of said sensor units to search downrange for targets within the field of view of that sensor unit.

7. The radar system of claim 5 wherein said controller is further configured to obtain crossrange information by using each of said sensor units to search for targets within the field of view of that sensor unit.

8. The radar system of claim 5 wherein said plurality of sensor units comprises a first sensor unit, a second sensor unit, and a third sensor unit, said first, second and third sensor units mounted to the rear of a vehicle such that each sensor unit has a field of view which extends behind said vehicle, said first function sensor unit mounted near the centerline of said vehicle, said second sensor unit mounted to the left of said first sensor unit and said third sensor unit mounted to the right of said first sensor unit.

9. The radar system of claim 5 wherein said plurality of sensor units comprises a first sensor unit and a second sensor unit, said first and second sensor units having a first and second field of view respectively, said first field of view being different from said second field of view.

10. The radar system of claim 9 wherein a portion of said first field of view overlaps a portion of said second field of view.

11. The radar system of claim 5 wherein said plurality of sensor units comprises a first sensor unit and a second sensor unit, said first and second sensor units mounted to a vehicle, said vehicle having left and right side-object regions, said first sensor unit having field of view that substantially covers said left side-object region and said second sensor unit having a field of view that substantially covers said right side-object region.

12. The radar system of claim 5 wherein said controller unit is configured to be operably connectable to a vehicle information bus.

13. The radar system of claim 12 wherein each of said sensor units is configured to be operably connectable to a vehicle information bus.

14. The radar system of claim 12 wherein said vehicle information bus carries radar data and data from other vehicle sensors.

15. A method for searching for targets to provide downrange information from a pulsed radar system, comprising the steps of:

selecting a range gate;

programming a time delay into a programmable time delay based on said range gate;

programming a gain into a programmable gain amplifier based on said range gate;

transmitting a carrier pulse of radio frequency energy;

receiving reflections of said carrier pulse of radio frequency energy, said reflections produced by said carrier pulse of radio frequency energy being reflected off of target objects;

downconverting said reflections to produce an intermediate frequency (IF) signal; and supplying a portion of said IF signal to said programmable gain amplifier, said portion selected by said programmable time delay.

16. A radar sensor capable of tracking and discriminating one or more Doppler shifted targets in downrange distance, said radar sensor comprising:

a radio frequency transmitter configured to transmit pulses of radio frequency energy;

a radio frequency receiver configured to receive said pulses of radio frequency energy;

a programmable time delay configured to select a selected portion of said pulses received by said radio frequency receiver;

a programmable gain amplifier configured to amplify said selected portion; and a controller unit, said controller unit configured to program said programmable time delay and said programmable gain amplifier to detect targets with a field of view of said sensor at different downrange distances.

17. The radar sensor of claim 16, wherein said controller unit is further configure to compute a velocity of said targets.

18. The radar sensor of claim 16, wherein said controller unit is further configured to compute an acceleration of said targets.

19. The radar sensor of claim 16, wherein said sensor is connected to a information bus.

20. The radar sensor of claim 19, wherein said sensor supplies information about said targets to an intelligent display connected to said information bus.

21. The radar sensor of claim 19, wherein said sensor supplies information about said targets to an airbag deployment system.

22. The radar sensor of claim 19, wherein said sensor supplies information about said targets to other vehicle systems connected to said information bus.

23. The radar sensor of claim 16, wherein said sensor measures a throttle position.

24. The radar sensor of claim 16, wherein said sensor provides information an active suspension system.

25. The radar sensor of claim 16, further comprising an audible warning device configured to project an audible warning signal, said warning signal projecting a first sound when said radar sensor detects a target having a first downrange distance, said warning signal projecting a second sound when said radar sensor detects a target having a second downrange distance.

26. The radar sensor of claim 16, further comprising an audible warning device configured to project an audible warning signal, said warning signal projecting a first sound when said radar sensor detects a closest target having a first downrange distance, said warning signal projecting a second sound when said radar sensor detects a closest target having a second downrange distance.

27. The radar sensor of claim 16, further comprising an audible warning device configured to project an audible warning signal, said warning signal projecting a first sound when said radar sensor detects a target having a first velocity, said warning signal projecting a second sound when said radar sensor detects a target having a second velocity.

28. The radar sensor of claim 16, further comprising an audible warning device configured to project an audible warning signal, said warning signal projecting a first sound when said radar sensor detects a target having a first time to impact, said warning signal projecting a second sound when said radar sensor detects a target having a second time to impact.

* * * * *

UNITED STATES PATENT AND TRADEMARK OFFICE
CERTIFICATE OF CORRECTION

PATENT NO.   : 6,069,581
DATED        : May 30, 2000
INVENTOR(S)  : David Allen Bell, Jimmy Moon Kan Li, Kelvin Chi Lee, and Roger Rong Taur It is certified that error appears in the above-identified patent and that said Letters Patent is hereby corrected as shown below:

Title page,
ABSTRACT, line 3, change "radar minimies" to -- radar minimizes --.

Column 21,
Line 41, change "cart program" to -- can program --.

Column 22,
Line 53, change "configure to compute" to -- configured to compute --.

Column 23,
Line 4, change "information an" to -- information to an --.

Signed and Sealed this

Eighth Day of January, 2002

Attest:

JAMES E. ROGAN
Attesting Officer       Director of the United States Patent and Trademark Office